(12) United States Patent
Holzer et al.

(10) Patent No.: US 10,950,032 B2
(45) Date of Patent: Mar. 16, 2021

(54) OBJECT CAPTURE COVERAGE EVALUATION

(71) Applicant: Fyusion, Inc., San Francisco, CA (US)

(72) Inventors: Stefan Johannes Josef Holzer, San Mateo, CA (US); Abhishek Kar, Berkeley, CA (US); Matteo Munaro, San Francisco, CA (US); Aidas Liaudanskas, San Francisco, CA (US); Matthias Reso, San Francisco, CA (US); Alexander Jay Bruen Trevor, San Francisco, CA (US); Radu Bogdan Rusu, San Francisco, CA (US)

(73) Assignee: Fyusion, Inc., San Francisco, CA (US)

(*) Notice: Subject to any disclaimer, the term of this patent is extended or adjusted under 35 U.S.C. 154(b) by 0 days.

(21) Appl. No.: 16/518,585

(22) Filed: Jul. 22, 2019

(65) Prior Publication Data
US 2020/0349757 A1 Nov. 5, 2020

Related U.S. Application Data

(60) Provisional application No. 62/843,119, filed on May 3, 2019.

(51) Int. Cl.
| | |
|---|---|
| *G06T 15/20* | (2011.01) |
| *G06T 17/20* | (2006.01) |
| *G06K 9/00* | (2006.01) |
| *G06F 3/0481* | (2013.01) |
| *G06T 7/50* | (2017.01) |

(52) U.S. Cl.
CPC ........ *G06T 15/205* (2013.01); *G06F 3/04815* (2013.01); *G06K 9/00201* (2013.01); *G06T 7/50* (2017.01); *G06T 17/20* (2013.01); *G06T 2207/30252* (2013.01)

(58) Field of Classification Search
CPC ......... G06T 15/205; G06T 7/50; G06T 17/20; G06T 2207/30252; G06F 3/04815; G06K 9/00201
See application file for complete search history.

(56) References Cited

U.S. PATENT DOCUMENTS

| | | | |
|---|---|---|---|
| 9,182,229 B2 | 11/2015 | Grässer et al. | |
| 9,218,698 B2 | 12/2015 | Ricci | |
| 9,495,764 B1 | 11/2016 | Boardman et al. | |
| 2009/0289957 A1* | 11/2009 | Sroka | G06T 7/74 345/634 |

(Continued)

OTHER PUBLICATIONS

Alberto Chavez-Aragon, et al., "Vision-Based Detection and Labelling of Multiple Vehicle Parts", 2011 14th International IEEE Conference on Intelligent Transportation Systems Washington, DC, USA. Oct. 5-7, 2011, 6 pages.

(Continued)

*Primary Examiner* — Haixia Du
(74) *Attorney, Agent, or Firm* — Kwan & Olynick LLP

(57) ABSTRACT

Pixels in a visual representation of an object that includes one or more perspective view images may be mapped to a standard view of the object. Based on the mapping, a portion of the object captured in the visual representation of the object may be identified. A user interface on a display device may indicate the identified object portion.

20 Claims, 16 Drawing Sheets
(8 of 16 Drawing Sheet(s) Filed in Color)

(56) References Cited

U.S. PATENT DOCUMENTS

2018/0338126 A1* 11/2018 Trevor .................. G01B 21/22

OTHER PUBLICATIONS

Wenhao Lu, et al., "Parsing Semantic Parts of Cars Using Graphical Models and Segment Appearance Consistency", arXiv:1406.2375v2 [cs.CV] Jun. 11, 2014, 12 pages.

Riza Alp Guler et al., "DensePose: Dense Human Pose Estimation in the Wild", arXiv:1802.00434v1 [cs.CV] Feb. 1, 2018, 12 pages.

* cited by examiner

OBJECT CAPTURE COVERAGE EVALUATION

CROSS-REFERENCE TO RELATED APPLICATIONS

The present application claims priority under 35 U.S.C. 120 to U.S. Provisional Patent Application No. 62/843,119, titled "Object Capture Coverage Evaluation", filed May 3, 2019, by Holzer et al., which is hereby incorporated by reference in its entirety and for all purposes.

COLORED DRAWINGS

The patent or application file contains at least one drawing executed in color. Copies of this patent or patent application publication with color drawing(s) will be provided by the Office upon request and payment of the necessary fee.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the processing of visual digital media content, and more specifically to object capture coverage evaluation.

DESCRIPTION OF RELATED ART

Single or multiple images of an object are frequently captured for various purposes, such as insurance claim evaluation, displaying the object in a listing for sale, or object damage evaluation. However, capturing a three-dimensional object with two-dimensional image data requires capturing image data from a variety of viewpoints. Ensuring that an object is sufficiently captured in a set of image data is difficult and typically requires manual inspection. Accordingly, improved techniques for evaluating coverage of an object in image data are desired.

OVERVIEW

Provided are various techniques, mechanisms, and processes relating to the processing of visual media data. According to various embodiments, a mapping of a respective plurality of pixels in a visual representation of an object to a designated standard view of the object may be determined. The visual representation of the object may include a designated perspective view image of the object. Based on the mapping, a designated portion of the object captured in the visual representation of the object may be identified. A user interface indicating the designated portion of the object may be provided on a display device.

In some implementations, the designated portion of the object may be identified at least in part by identifying one or more portions of a grid overlaid on the standard view of the object. Each of the identified grid portions may include one or more of the mapped pixels.

According to various embodiments, each of the identified grid portions may be associated with a respective coverage estimation value indicating a degree of coverage of the identified grid portion in the designated perspective view image of the object. The respective coverage estimation value may include a probability value estimating a probability that the identified grid portion is represented in the designated perspective view of the object. Alternately, or additionally, the respective coverage estimation value may include an uncertainty value identifying a degree of statistical uncertainty attached to the probability value.

In particular embodiments, the respective coverage estimation value may be determined based on a distance from a camera to the object, where the distance is associated with one or more of the pixels included in the identified grid portion. Alternately, or additionally, the respective coverage estimation value may be determined based on an angle of a camera with respect to the object, where the angle is associated with one or more of the pixels included in the identified grid portion.

In some implementations, the visual representation of the object may include a plurality of perspective view images including the designated perspective view image. Each of the plurality of perspective view images may capture a portion of the object from a respective viewpoint. The designated portion of the object may be captured in one or more of the perspective view images, and a respective coverage evaluation mapping may be determined for each of the plurality of perspective view images based on the pixel mapping.

In some implementations, the designated portion of the object captured may be determined by aggregating the coverage evaluation mappings. Aggregating the coverage evaluation mappings may include determining a probability of coverage for each of a plurality of portions of a grid overlaid on the standard view of the object.

In particular embodiments, the multi-view representation of the object may be navigable in three dimensions. The multi-view representation may be constructed at a mobile computing device that includes the processor. The multi-view representation may be constructed at least in part based on inertial measurement unit (IMU) data collected from an IMU in the mobile computing device.

In some embodiments, the designated portion of the object may be indicated in the user interface via a heatmap. The object may be a vehicle.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods and computer program products for processing visual data. These drawings in no way limit any changes in form and detail that may be made by one skilled in the art without departing from the spirit and scope of the disclosed implementations.

DETAILED DESCRIPTION

Figure 1:
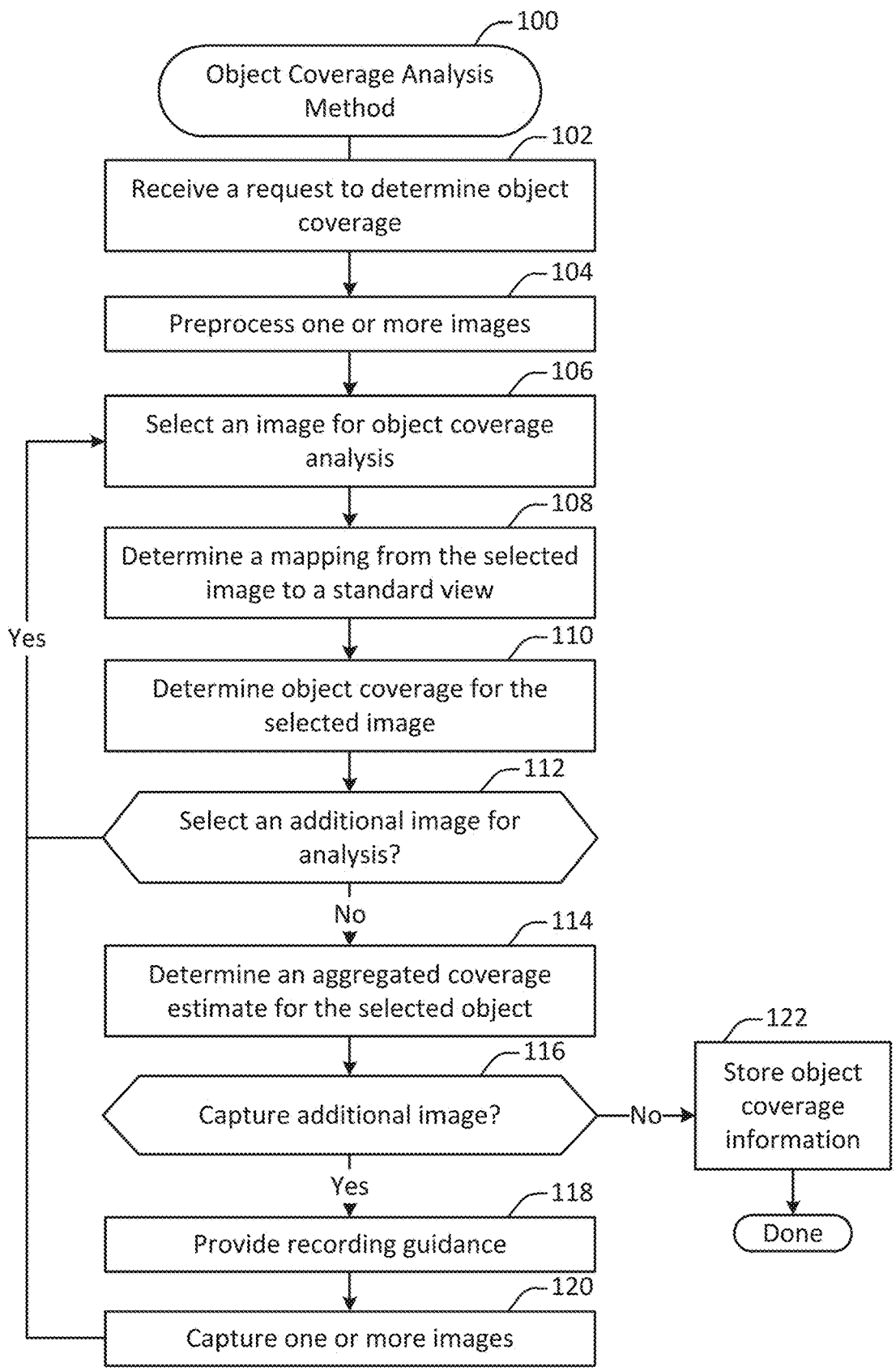
FIG. 1 illustrates one example of an object coverage analysis method, performed in accordance with one or more embodiments.

According to various embodiments, techniques and mechanisms described herein facilitate making a determination as to the extent to which visual data includes each part of the object or at least designated parts of the object. Determining whether an object has been sufficiently captured in visual data is an important objective in many applications. For instance, determining which parts of the object are captured visually and/or whether the entire object is captured reduces and/or removes the potential need for repeated interactions to capture additional information.

In particular embodiments, techniques and mechanisms are described herein with reference to determining whether a portion of an object such as a vehicle is captured in a multi-view representation. However, such a determination may be made for various types of visual data, such as one or more individual images.

According to various embodiments, techniques and mechanisms described herein may facilitate the capture of multi-view representations of an object. Multi-view data may include images of an object captured from different viewpoints. For example, a user may walk around an object such as a vehicle and capture images from different angles. In some configurations, the multi-view data may include data from various types of sensors. For example, the multi-view data may include data from more than one camera. As another example, the multi-view data may include data from a depth sensor. As another example, the multi-view data may include data collected from an inertial measurement unit (IMU). IMU data may include position information, acceleration information, rotation information, or other such data collected from one or more accelerometers or gyroscopes.

In particular embodiments, the multi-view data may be aggregated to construct a multi-view representation. Additional details regarding multi-view data collection, multi-view representation construction, and other features are discussed in co-pending and commonly assigned U.S. patent application Ser. No. 15/934,624, "Conversion of an Interactive Multi-view Image Data Set into a Video", by Holzer et al., filed Mar. 23, 2018, which is hereby incorporated by reference in its entirety and for all purposes.

In particular embodiments, a multi-view representation may be navigable in three dimensions. For example, a user may access a multi-view representation on a mobile device equipped with a touch screen. The user may then swipe in different directions to move between contiguous viewpoints.

According to various embodiments, a determination as to whether an object or portion of an object is captured in visual data may be made as a binary outcome, and for the purpose of illustration may be described as such herein. Alternately, or additionally, in some embodiments such a determination may include various types of other information. For example, a given portion of an object may be associated with information such as the number of images in which the object portion is captured, the angle or angles at which the object portion is captured, the distance or distances from the camera from which the object portion is captured, and/or any other suitable information.

In particular embodiments, the object depicted in a multi-view representation may be a vehicle. For example, an insurance claim may require all or a sufficient portion of a vehicle to be captured visually for the claim to be processed. However, the techniques and mechanisms described herein apply to various types of objects, and are by no means limited to vehicles. Instead, vehicles are used as an illustrative example of the applicability of techniques and mechanisms described herein according to one or more embodiments.

As another example, an indication as to whether all parts of a vehicle are visually captured can also be used to facilitate the listing of the vehicle for sale on a website. For instance, a vehicle associated with a comprehensive multi-view representation may be associated with a special badge or otherwise treated favorably. Ensuring that the vehicle is fully captured in a multi-view representation may help to build trust for potential buyers. In some contexts, a vehicle listing may require a specific set of images to be captured from specific view-points.

As yet another example, an indication as to whether all parts of a vehicle are visually captured can facilitate accurate automated damage detection. For instance, an automated damage detection procedure may analyze multi-view damage to automatically detect and represent damage to a vehicle. For such a procedure to function, a sufficiently comprehensive representation of the vehicle is needed. Accordingly, techniques and mechanisms described herein may be applied to evaluate the comprehensiveness of a multi-view capture of an object.

FIG. 1 illustrates a method for analyzing object coverage, performed in accordance with one or more embodiments. According to various embodiments, the method 100 may be performed at a mobile computing device such as a smart phone. The smart phone may be in communication with a remote server. The method 100 may be used to detect coverage in a set of images and/or a multi-view representation of any of various types of objects. However, for the purpose of illustration, many examples discussed herein will be described with reference to vehicles.

A request to determine coverage of an object is received at 102. In some implementations, the request to determine coverage may be received at a mobile computing device such as a smart phone. In particular embodiments, the object may be a vehicle such as a car, truck, or sports utility vehicle.

In some implementations, the request to determine coverage may include or reference input data. The input data may include one or more images of the object captured from different perspectives. Alternatively, or additionally, the input data may include video data of the object. In addition to visual data, the input data may also include other types of data, such as IMU data.

One or more images are pre-processed at 104. According to various embodiments, one or more images may be pre-processed in order to perform operations such as skeleton detection, object recognition, or 3D mesh reconstruction. For some such operations, input data from more than one perspective view image may be used.

In some implementations, skeleton detection may involve one or more of a variety of techniques. Such techniques may include, but are not limited to: 2D skeleton detection using machine learning, 3D pose estimation, and 3D reconstruction of a skeleton from one or more 2D skeletons and/or poses. Additional details regarding skeleton detection and other features are discussed in co-pending and commonly assigned U.S. patent application Ser. No. 15/427,026, titled "Skeleton Detection and Tracking via Client-server Communication" by Holzer et al, filed Feb. 7, 2017, which is hereby incorporated by reference in its entirety and for all purposes.

According to various embodiments, a 3D representation of an object such as a 3D mesh, potentially with an associated texture map, may be reconstructed. Alternately, the 3D representation may be a mesh based on a 3D skeleton that has a mapping to the top-down mapping defined. When generating a 3D mesh representation, per-frame segmentation and/or space carving based on estimated 3D poses of the cameras corresponding to those frames may be performed. In the case of a 3D skeleton, such operations may be performed using a neural network that directly estimates a 3D skeleton for a given frame or from a neural network that estimates 2D skeleton joint locations for each frame and then use poses for all camera viewpoints to triangulate the 3D skeleton.

According to various embodiments, a standard 3D model may be used for all objects of the type represented, or may be constructed based on an initial set of perspective view images captured before damage is detected. Such techniques may be used in conjunction with live, pre-recorded, or guided image selection and analysis.

An image is selected for object coverage analysis at 106. According to various embodiments, the image may be captured at a mobile computing device such as a mobile phone. In some instances, the image may be a view in a multi-view capture. A multi-view capture may include different images of the object captured from different perspectives. For instance, different images of the same object may be captured from different angles and heights relative to the object.

In some implementations, images may be selected in any suitable order. For example, images may be analyzed sequentially, in parallel, or in some other order. As another example, images may be analyzed live as they are captured by a mobile computing device, or in order of their capture.

In particular embodiments, selecting an image for analysis may involve capturing an image. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

A mapping of the selected perspective view image to a standard view is determined at 108. In some embodiments, the standard view may be determined based on user input. For example, the user may identify a vehicle in general or a car, truck, or sports utility vehicle in particular as the object type.

In some implementations, a standard view may be a top-down view of the object that shows the top and the sides of the object. A mapping procedure may then map each point in the image to a corresponding point in the top-down view. Alternately, or additionally, a mapping procedure may map each point in the top-down view to a corresponding point in the perspective view image.

According to various embodiments, a standard view may be determined by performing object recognition. The object type may then be used to select a standard image for that particular object type. Alternately, a standard view specific to the object represented in the perspective view may be retrieved. For example, a top-down view, 2D skeleton, or 3D model may be constructed for the object.

In some embodiments, a neural network may estimate 2D skeleton joints for the image. Then, a predefined mapping may be used to map from the perspective view image to the standard image (e.g., the top-down view). For instance, the predefined mapping may be defined based on triangles determined by the 2D joints.

In some implementations, a neural network may predict a mapping between a 3D model (such as a CAD model) and the selected perspective view image. The coverage may then be mapped to, and aggregated on, the texture map of the 3D model.

Object coverage for the selected image is determined at 110. According to various embodiments, object coverage may be determined by analyzing the portion of the standard view on which the perspective view image has been mapped.

As another example, an object or top-down image of an object may be divided into a number of components or portions. A vehicle, for instance, may be divided into doors, a windshield, wheels, and other such parts. For each part to which at least a portion of the perspective view image has been mapped, a determination may be made as to whether the part is sufficiently covered by the image. This determination may involve operations such as determining whether any sub-portions of the object component are lacking a designated number of mapped pixels.

In particular embodiments, object coverage may be determined by identifying an area that includes some or all of the mapped pixels. The identified area may then be used to aggregate coverage across different images.

In some embodiments, a grid or other set of guidelines may be overlaid on the top-down view. The grid may be composed of identical rectangles or other shapes. Alternately, the grid may be composed of portions of different sizes. For example, in the image 306 shown in FIG. 3, portions of the object that include greater variation and detail, such as the headlights, are associated with relatively smaller grid portions.

In some implementations, grid density may represent a tradeoff between various considerations. For example, if the grid is too fine, then false negative errors may occur because noise in perspective view image mapping may mean many grid cells are incorrectly identified as not being represented in the perspective view image because no pixels are mapped to the grid cell. However, if the grid is too coarse, then false positive errors may occur because relatively many pixels may map to a large grid portion even if a subportion of the large grid portion is not adequately represented.

In particular embodiments, the size of a grid portion may be strategically determined based on characteristics such as the image resolution, computing device processing power, number of images, level of detail in the object, feature size at a particular object portion, or other such considerations.

In particular embodiments, an indication of coverage evaluation may be determined for the selected image for each grid portion. The indication of coverage evaluation may include one or more components. For example, the indication of coverage evaluation may include a primary value such as a probability value identifying a probability that a given grid portion is represented in the selected image. As another example, the indication of coverage evaluation may include a secondary value such as an uncertainty value or standard error value identifying a degree of uncertainty surrounding the primary value. A value included in an indication of coverage may be modeled as a continuous, discrete, or binary value.

In particular embodiments, an uncertainty value or standard error value may be used to aggregate across different frames. For example, a low degree of confidence about the coverage of the front right door from a particular image would lead to a high uncertainty value, which may lead to a lower weight attributed to the particular image while determining aggregate coverage of the front right door.

In some implementations, the indication of coverage evaluation for a selected image and a given grid portion may be affected by any of a variety of considerations. For example, a given grid portion may be associated with a relatively higher probability of coverage in a selected image if the selected image includes a relatively higher number of pixels that map to the given grid portion. As another example, a pixel may be up-weighted in terms of its effect on coverage estimation if the image or image portion in which the pixel is included is captured from a relatively closer distance to the object. As yet another example, a pixel may be down-weighted in terms of its effect on coverage estimation if the image or image portion in which the pixel is included is captured from an oblique angle. In contrast, a pixel may be up-weighted in terms of its effect on coverage estimation if the image or image portion in which the pixel is included is captured from angle closer to 90 degrees.

In particular embodiments, a probability value and an uncertainty value for a grid may depend on factors such as the number and probability of pixel values assigned to the grid cell. For example, if N pixels end up in a grid cell with their associated scores, the probability of coverage may be modeled as the mean probability score of the N pixels, while the uncertainty value may be modeled as the standard deviation of the N pixels. As another example, if N pixels end up in a grid cell with their associated scores, the probability of coverage may be modeled as N times the mean probability score of the N pixels, while the uncertainty value may be modeled as the standard deviation of the N pixels.

At 112, a determination is made as to whether to select an additional image for analysis. According to various embodiments, each image may be analyzed in sequence, in parallel, or in any suitable order. Alternately, or additionally, images may be analyzed until one or more component-level and/or aggregate coverage levels meet a designated threshold.

An aggregated coverage estimate is determined for the selected object at 114. In some embodiments, determining an aggregated coverage estimate may involve overlaying on the standard view of the object different pixel mappings determined at 106 for different images. Then, the same types of techniques discussed with respect to operation 110 may be performed on the overlaid standard view image. However, such techniques may suffer from the drawback that pixel mappings may be noisy, so different images may randomly have some number of pixels mapped to the same object portion.

According to various embodiments, determining an aggregated coverage estimate may involve combining coverage areas determined at 108 for different images. For example, for each grid portion a determination may be made as to whether any image captures the grid portion with a probability that exceeds a designated threshold. As another example, a weighted average of the coverage indications may be determined for each grid portion to aggregate the image-level coverage estimations.

In some implementations, determining an aggregated coverage estimate may involve evaluating different object components. A determination may be made for each component as to whether the component has been captured in a sufficient level of detail or clarity. For example, different grid portions associated with an object component such as a wheel or a door may be combined to determine a coverage indication for the component as a whole. As another example, grid-level heatmaps may be smoothed out over a given object component to determine a component-level object coverage estimate.

In some implementations, determining an aggregated coverage estimate may involve determining an object-level coverage estimate. For example, a determination may be made as to whether the mapped pixels from all perspective views are sufficiently dense over all or designated portions of the object.

In some implementations, determining an aggregated coverage estimate may involve determining whether a portion of the object has been captured from a designated perspective or at a designated distance. For example, an image or image portion of an object portion captured from a distance outside a designated distance range and/or a designated angular range may be down-weighted or ignored when determining image coverage.

In some implementations, the aggregated coverage estimate may be implemented as a heat map. The heat map may be on the grid level, or may be smoothed out.

In some embodiments, the aggregated coverage estimate may be modulated in one or more ways. For example, a coverage estimate may be computed specifically for visual data captured within, below, or above a designated coverage range. As another example, a coverage estimate may be computed specifically for visual data captured within, below, or above a designated angular distance of the object surface relative to the camera.

In particular embodiments, a modulated coverage estimate may be generated and stored in a way that is adjustable. For example, a user may slide a slider affordance in a user interface to adjust the minimum distance, maximum distance, minimum angle, and/or maximum angle for evaluating coverage.

A determination is made at 116 as to whether to capture an additional image. If the determination is made to capture an additional image, then at 118 guidance for additional viewpoint capture is provided. At 120, one or more images are captured based on the recording guidance. In some implementations, the image collection guidance may include any suitable instructions for capturing an additional image that may assist in improving coverage. Such guidance may include an indication to capture an additional image from a targeted viewpoint, to capture an additional image of a designated portion of the object, or to capture an additional image at a different level of clarity or detail. For example, if coverage of a particular portion of the object is inadequate or missing, then feedback may be provided to capture additional detail at the object portion for which coverage is lacking.

In some implementations, the guidance for additional viewpoint capture may be provided so as to improve object coverage as discussed with respect to the operation 110 and 114. For example, if the coverage of an object or object portion is very high, additional viewpoint capture may be unnecessary. However, if the coverage of the object or a portion of the object is low, then capturing an additional image may help to improve the coverage In particular embodiments, one or more thresholds for determining whether to provide guidance for an additional image may be strategically determined based on any of a variety of considerations. For example, the threshold may be determined based on the number of images of the object or object component that have been previously captured. As another example, the threshold may be specified by a systems administrator. As yet another example, additional images may be captured until images from each of a set of designated perspective viewpoints have been captured.

According to various embodiments, the image collection feedback may include any suitable instructions or information for assisting a user in collecting additional images. Such guidance may include, but is not limited to, instructions to collect an image at a targeted camera position, orientation, or zoom level. Alternatively, or additionally, a user may be presented with instructions to capture a designated number of images or an image of a designated portion of the object.

For example, a user may be presented with a graphical guide to assist the user in capturing an additional image from a target perspective. As another example, a user may be presented with written or verbal instructions to guide the user in capturing an additional image. Additional techniques for determining and providing recording guidance as well as other related features are described in co-pending and commonly assigned U.S. patent application Ser. No. 15/992,546, titled "Providing Recording Guidance in Generating a Multi-View Interactive Digital Media Representation", filed May 30, 2018 by Holzer et al.

In some embodiments, the system may analyze the captured image or images to determine whether a sufficient portion of the object has been captured in sufficient detail to support damage analysis. For example, the system may analyze the capture image or images to determine whether the object is depicted from all sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints.

When it is determined to not select an additional image for analysis, then at 122 the coverage information is stored. For example, the coverage information may be stored on a storage device. Alternatively, or additionally, the images may be transmitted to a remote location via a network interface.

In some implementations, the method shown in FIG. 1 may include one or more operations other than those shown in FIG. 1. For example, the method 100 may include one or more procedures for identifying the object or object component included in the selected image. Such a procedure may include, for instance, a neural network trained to identify object components.

In particular embodiments techniques and mechanisms described herein may be used in conjunction with damage detection analysis. According to various embodiments, damage may be detected by applying a neural network to the selected image. The neural network may identify damage to the object included in the image. In particular embodiments, the damage may be represented as a heatmap. The damage information may identify the damage type and/or severity. For example, the damage information may identify damage as being light, moderate, or severe. As another example, the damage information may identify the damage as a dent or a scratch. Detected damage may then be mapped from the perspective view to the standard view.

According to various embodiments, damage information may be aggregated on the standard view. Aggregating damage on the standard view may involve combining the damage mapped for one perspective view with damage mapped for other perspective view images. For example, damage values for the same component from different perspective view images may be summed, averaged, or otherwise combined.

According to various embodiments, the damage probability information may be determined. Damage probability information may identify a degree of certainty with which detected damage is ascertained. For instance, in a given perspective view it may be difficult to determine with certainty whether a particular image of an object portion depicts damage to the object or glare from a reflected light source. Accordingly, detected damage may be assigned a probability or other indication of certainty. However, the probability may be resolved to a value closer to zero or one with analysis of different perspective views of the same object portion.

In particular embodiments, the probability information for aggregated damage information in standard view may be updated based on from which views the damage was detected. For example, damage likelihood may increase if it is detected from multiple viewpoints. As another example, damage likelihood may increase if it is detected from one or more close-up views. As another example, damage likelihood may decrease if damage is only detected in one viewpoint but not in others. As yet another example, different results may be used to "vote" on a common representation.

Figure 2:
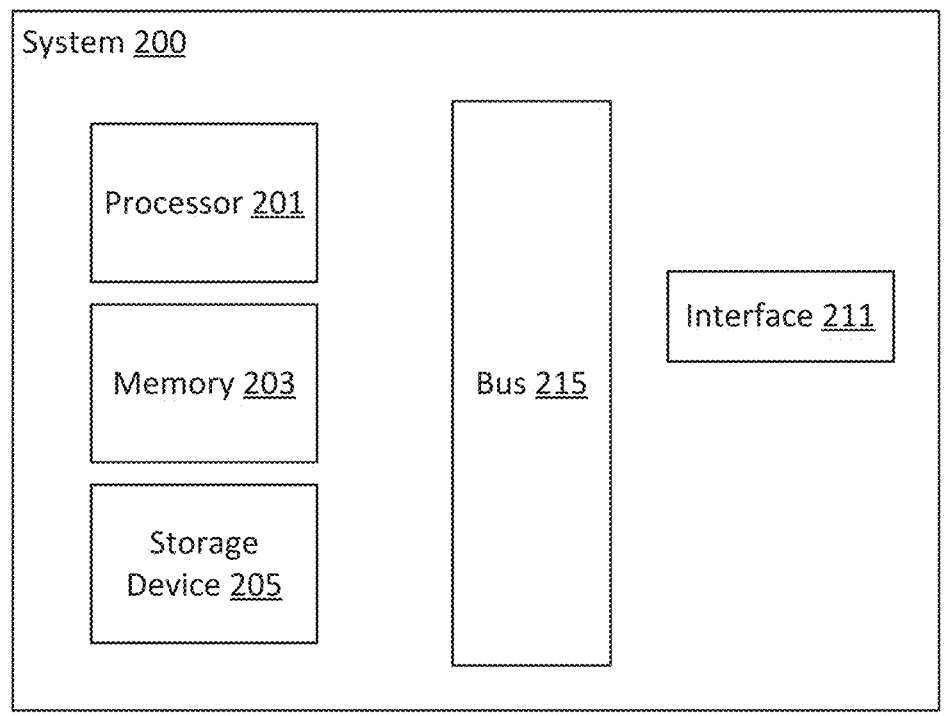
FIG. 2 illustrates a particular example of a computer system configured in accordance with various embodiments.

FIG. 2 illustrates one example of a computing device. According to various embodiments, a system 200 suitable for implementing embodiments described herein includes a processor 201, a memory module 203, a storage device 205, an interface 211, and a bus 215 (e.g., a PCI bus or other interconnection fabric.) Device 200 may operate as variety of devices such as mobile computing devices, servers, or any other device or service described herein. Although a particular configuration is described, a variety of alternative configurations are possible. The processor 201 may perform operations such as image view mapping and object coverage evaluation. Instructions for performing such operations may be embodied in the memory 203, on one or more non-transitory computer readable media, or on some other storage device. Various specially configured devices can also be used in place of or in addition to the processor 201. The interface 211 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 3:
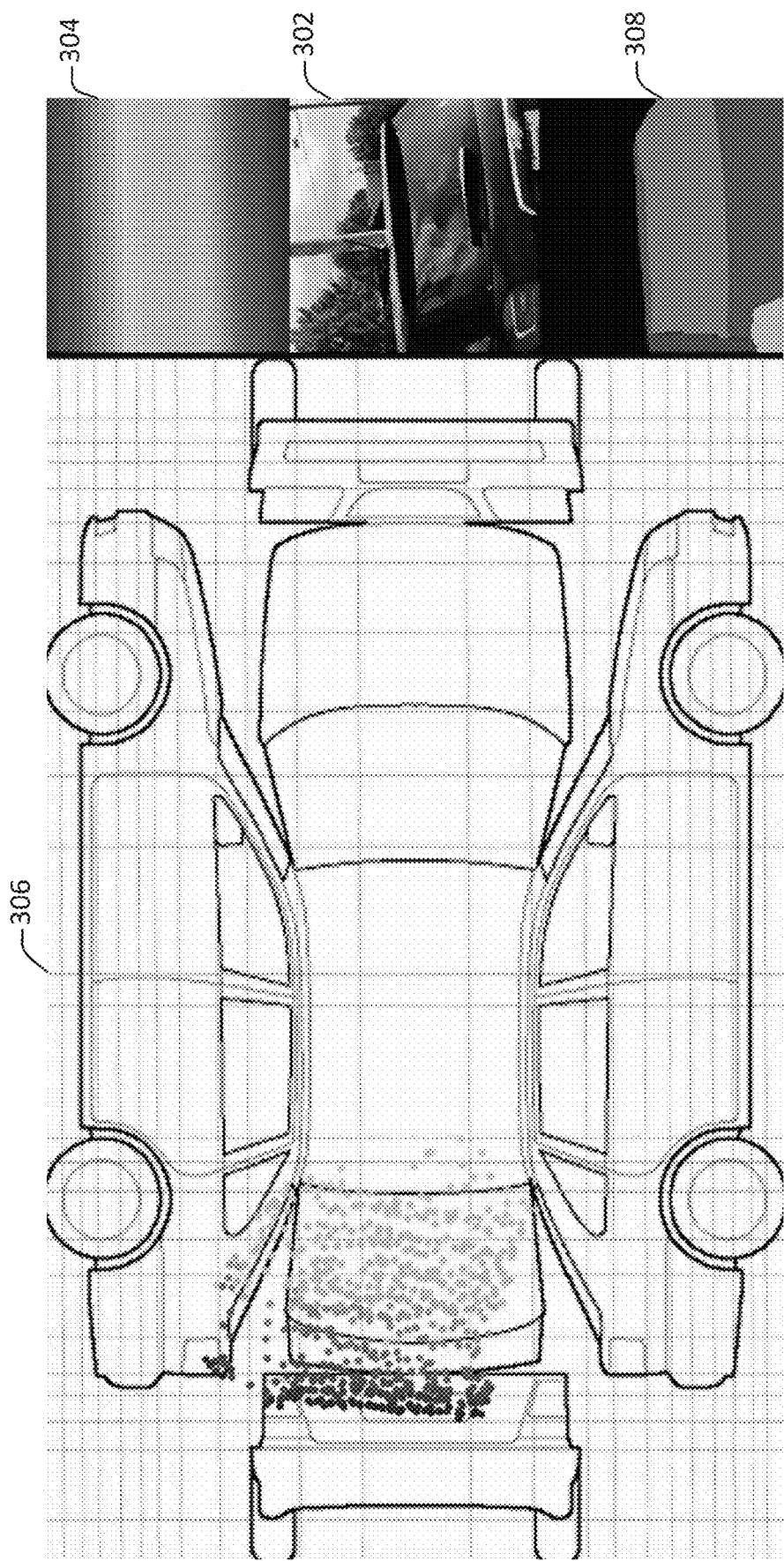
FIG. 3 illustrates one example of an image mapping, generated in accordance with one or more embodiments.

FIG. 3 shows a top-down image that has been mapped to a perspective view image. In FIG. 3, the image 302 is the input image, the image 304 indicates the color-coded location of each pixel in the input image, and the image 306 shows how the pixels in the input image are mapped onto the top-down view. The image 308 on the right shows color coded object components, such as a rear windshield and lower rear door panel.

According to various embodiments, a mapping from a perspective view image to a standard view such as a top-down view may contain noise. Accordingly, the density of mapped points in an area can be used to compute a probability as to whether a specific object component has been captured. This probability can also depend at least in part on where the mapped points are located in the input image. For example, points in the center of the input image can map to a higher probability than points on the borders of the input image.

In some implementations, one or more constraints may be used to help determine whether a region was imaged or not. For example, the distance between the camera and the imaged object component can be used to determine whether or not a mapped point is considered as having been captured.

In some embodiments, a requirement may be imposed that each object component (e.g., vehicle part) be imaged from a designated distance, within a range of designated distances, or from a distance that is smaller than a designated distance. Such a requirement may help to ensure sufficient image quality.

In some embodiments, a requirement may be imposed as to the angle or angles at which each object component is imaged. For example, some applications may require each object component to be imaged with the camera directly facing the component straight on rather than at a high angle. Therefore, points that correspond to parts of the object that are imaged at a high angle might be discarded or counted only with a very small probability.

Figure 4:
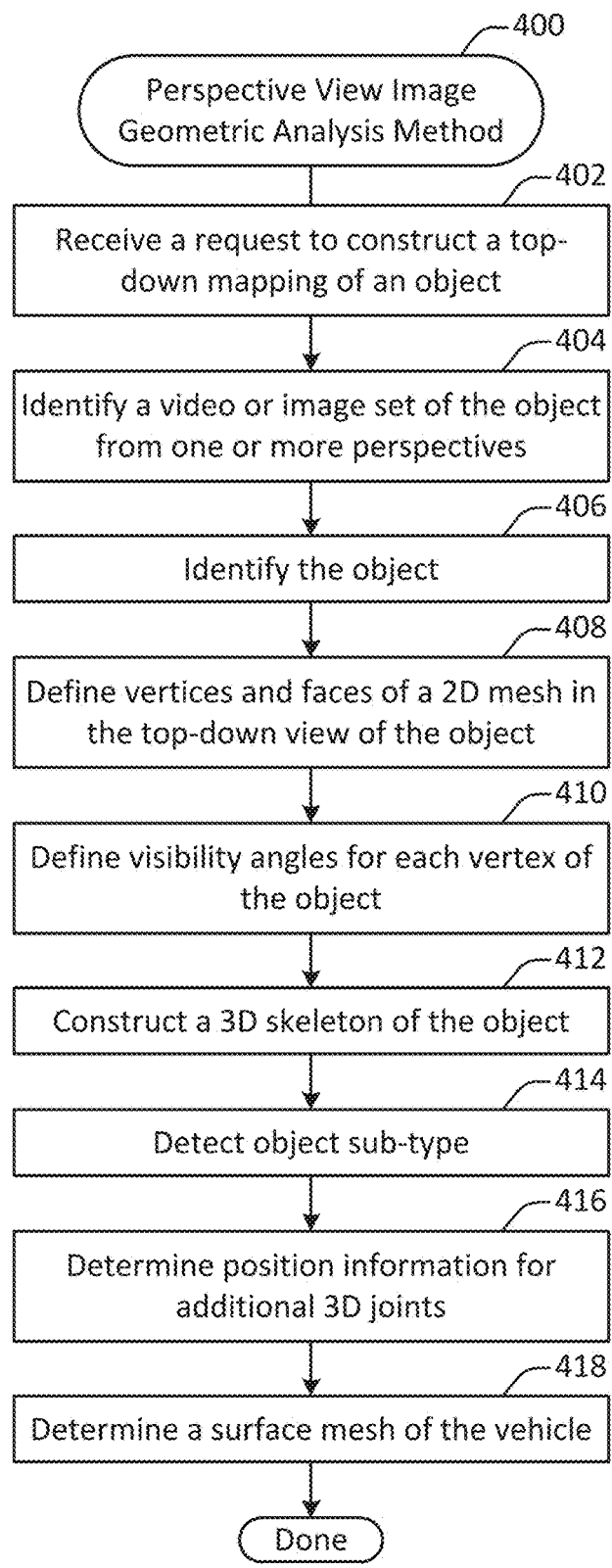
FIG. 4 illustrates one example of a method for performing geometric analysis of a perspective view image, performed in accordance with one or more embodiments.

FIG. 4 illustrates one example of a method 400 for performing geometric analysis of a perspective view image, performed in accordance with one or more embodiments. The method 400 may be performed on any suitable computing device. For example, the method 400 may be performed on a mobile computing device such as a smart phone. Alternately, or additionally, the method 400 may be performed on a remote server in communication with a mobile computing device.

A request to construct a top-down mapping of an object is received at 402. According to various embodiments, the request may be received at a user interface. At 404, a video or image set of the object captured from one or more perspectives is identified. The video or image set is referred to herein as "source data". According to various embodiments, the source data may include a 360-degree view of the object. Alternately, the source data may include a view that has less than 360-degree coverage.

In some embodiments, the source data may include data captured from a camera. For example, the camera may be located on a mobile computing device such a mobile phone. As another example, one or more traditional cameras may be used to capture such information.

In some implementations, the source data may include data collected from an inertial measurement unit (IMU). IMU data may include information such as camera location, camera angle, device velocity, device acceleration, or any of a wide variety of data collected from accelerometers or other such sensors.

The object is identified at 406. In some implementations, the object may be identified based on user input. For example, a user may identify the object as a vehicle or person via a user interface component such as a drop-down menu.

In some embodiments, the object may be identified based on image recognition. For example, the source data may be analyzed to determine that the subject of the source data is a vehicle, a person, or another such object. The source data may include a variety of image data. However, in case of a multi-view capture the source data focuses in a particular object from different viewpoints, the image recognition procedure may identify commonalities between the different perspective views to isolate the object that is the subject of the source data from other objects that are present in some portion of the source data but not in other portions of the source data.

At 408, vertices and faces of a 2D mesh are defined in the top-down view of the object. According to various embodiments, each face may represent a part of the object surface that could be approximated as being planar. For example, when a vehicle is captured in the source data, the vehicle's door panel or roof may be represented as a face in a 2D mesh because the door and roof are approximately planar despite being slightly curved.

In some embodiments, vertices and faces of a 2D mesh may be identified by analyzing the source data. Alternately, or additionally, the identification of the object at 406 may allow for the retrieval of a predetermined 2D mesh. For example, a vehicle object may be associated with a default 2D mesh that may be retrieved upon request.

Visibility angles are determined for each vertex of the object at 410. According to various embodiments, a visibility angle indicates the range of object angles with respect to the camera for which the vertex is visible. In some embodiments, visibility angles of a 2D mesh may be identified by analyzing the source data. Alternately, or additionally, the identification of the object at 406 may allow for the retrieval of predetermined visibility angle along with a predetermined 2D mesh. For example, a vehicle object may be associated with a default 2D mesh with associated visibility angle that may be retrieved upon request.

A 3D skeleton of the object is constructed at 412. According to various embodiments, constructing a 3D skeleton may involve any of a variety of operations. For example, 2D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from 2D skeletons and or poses. Additional details regarding skeleton detection are discussed in co-pending and commonly assigned U.S. patent application Ser. No. 15/427,026, titled "Skeleton Detection and Tracking via Client-server Communication" by Holzer et al, filed Feb. 7, 2017, which is hereby incorporated by reference in its entirety and for all purposes.

Figure 9:
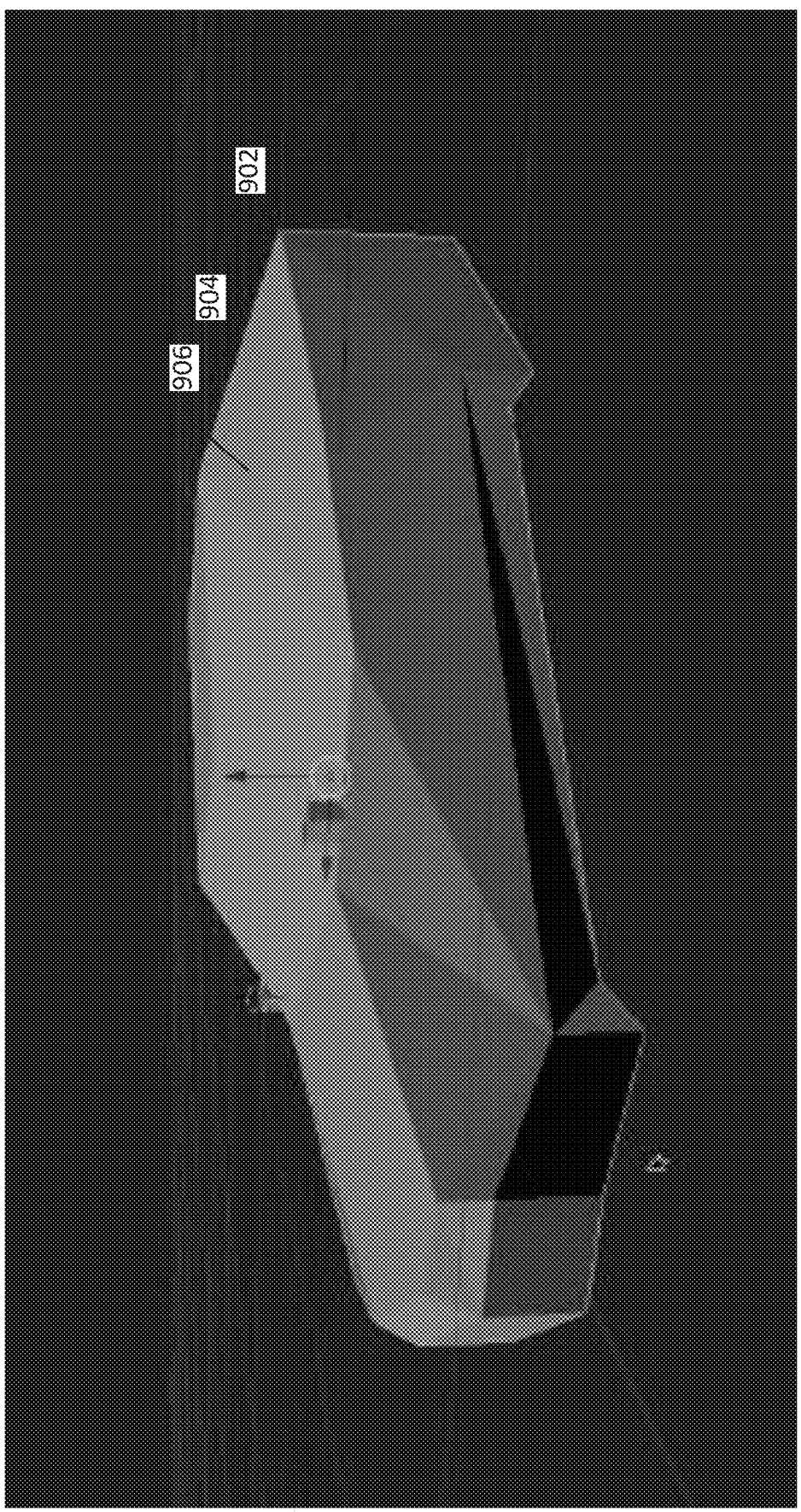
FIG. 9, FIG. 10, FIG. 11, FIG. 12, FIG. 13, FIG. 14, and FIG. 15 illustrate images processed in accordance with one or more embodiments.

FIG. 9 illustrates an example of a 3D mesh of an object whose vertices correspond to the joints of the 3D skeleton of the object. According to various embodiments, a 3D mesh may include vertices, edges, and faces that collectively represent an abstract projection of one or more 2D images of an object into three dimensions. For example, the 3D mesh shown in FIG. 9 includes a vertex 902, an edge 904, and a face 906. In particular embodiments, the joints' 3D position (i.e. the 3D skeleton) vary between object instances, while the connectivity between the joints (that are the mesh faces) may be defined once for an object category. For example, the mesh faces may be the same for every vehicle, or every vehicle of a particular type.

Techniques and mechanisms described are sometimes described with respect to source data that includes video and/or multiple images captured from different viewpoints. However, in some implementations techniques and mechanisms described herein may be applied to source data that includes a single image. For example, a 2D skeleton may be determined based on an image. Then, a 3D mesh may be defined that allows the mapping of information from the top-down view to the 3D mesh (or vice versa).

In some embodiments, because a single image makes constructing a 3D model of the skeleton more difficult, the detected 2D skeleton may be treated as the projection of the 3D model of the skeleton and used accordingly to propagate the points. Alternately, machine learning may be used to directly detect a 3D skeleton from a single image. Such an approach may be applied, for instance, by training a machine learning model based supplying a set of input images and resulting 3D skeletons constructed based on a more complete set of images.

In some implementations, a 3D surface mesh model of an object may be available. For example, such a mesh model may be computed through segmentation and space carving or through other 3D reconstruction methods. This 3D surface mesh model may more precisely follow the surface of an actual object than the 3D skeleton mesh model. Accordingly, the mapping procedure may identify the nearest surface mesh points to the skeleton joints and then define a mapping from the skeleton mesh to the surface mesh (or vice versa) using those skeleton joints to surface mesh correspondences. This mapping may be used to facilitate improved point or pixel mapping.

Returning to FIG. 4, an object sub-type is detected at 414. In some embodiments, an object sub-type may be a refinement of the object identification performed at 406 based on the additional information defined and determined at operations 408-412. For example, a vehicle object type may be refined to reflect a body type such as a sedan, a sports utility vehicle, or a pickup truck.

According to various embodiments, an object sub-type may be identified in any of various ways. For example, an object sub-type may be automatically detected from the 3D skeleton. As another example, an object sub-type may be identified based on user input. As another example, an object sub-type may be identified based on a machine learning algorithm, which may be applied to the original source data and/or to refines of the source data such as the 3D skeleton.

If necessary, position information for additional 3D joints is determined at 416. According to various embodiments, the position of additional 3D joints may be inferred from the existing 3D skeleton. For example, a 3D skeleton of a vehicle may reveal that the vehicle has four wheels, even if a wheel is not visible in the source data. In this way, the final 3D skeleton may be expanded to include all of the vertices of the mesh defined in the top-down image.

In some implementations, the inference of additional 3D joints may depend on the object sub-type. For example, a pickup truck may have different 3D joints than a sedan or sports utility vehicle.

A surface mesh of the vehicle is determined at 418. According to various embodiments, the surface mesh may be determined by using the 3D skeleton joints as vertices of the mesh. For example, each face of the mesh may approximate the object shape with a planar surface. FIG. 9 shows an example of a surface mesh.

Figure 5:
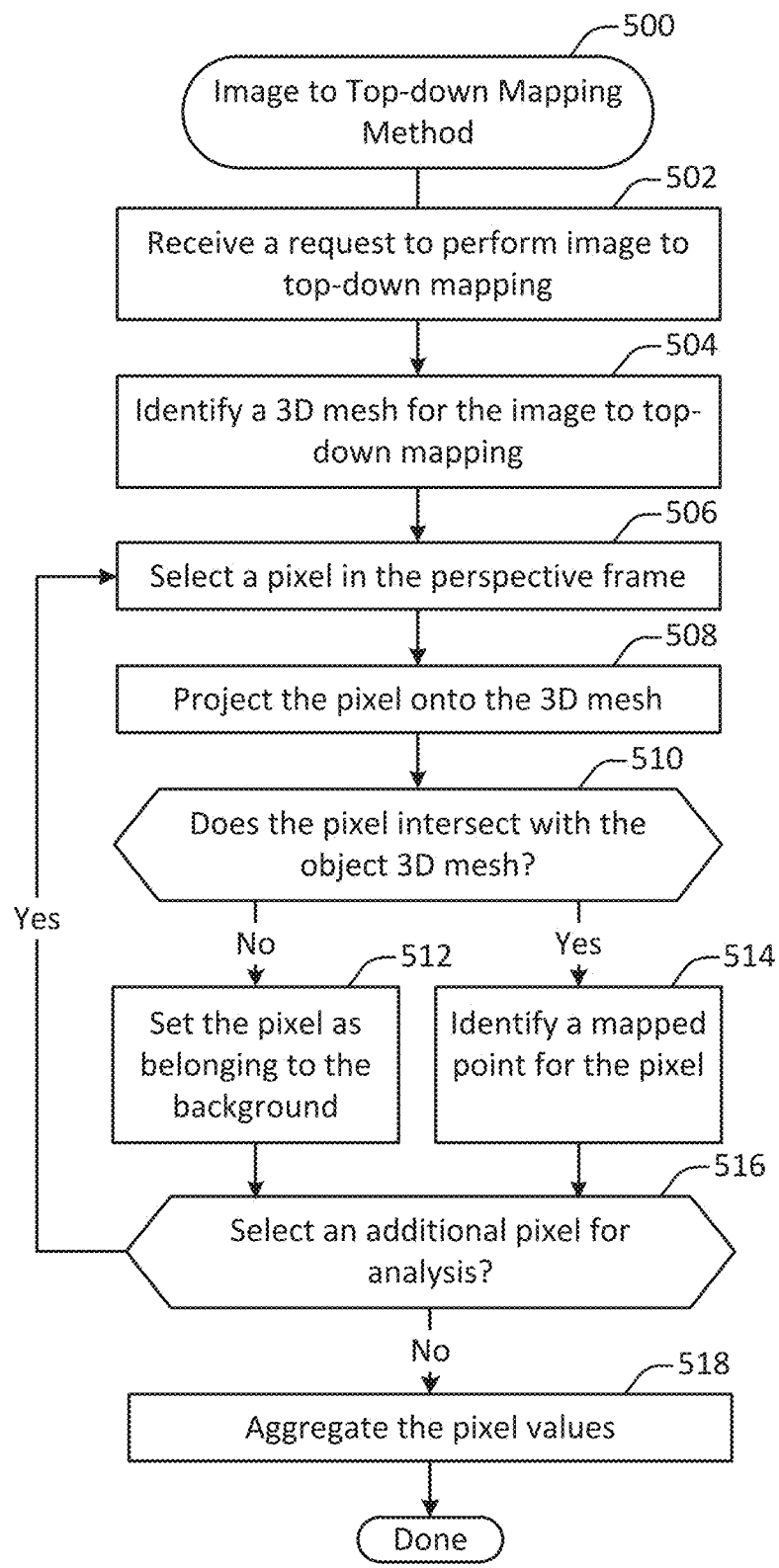
FIG. 5 illustrates one example of a method for performing perspective image to top-down view mapping, performed in accordance with one or more embodiments.

FIG. 5 illustrates one example of a method 500 for performing perspective image to top-down view mapping, performed in accordance with one or more embodiments. In some embodiments, the method 500 may be performed to map each pixel of an object represented in a perspective view to the corresponding point in a predefined top-down view of that class of objects.

The method 500 may be performed on any suitable computing device. For example, the method 500 may be performed on a mobile computing device such as a smart phone. Alternately, or additionally, the method 500 may be performed on a remote server in communication with a mobile computing device.

A request to construct a top-down mapping of an object is received at 502. According to various embodiments, the request may be generated after the performance of geometric analysis as discussed with respect to the method 400 shown in FIG. 4. The request may identify one or more images for which to perform the top-down mapping. For example, the images used to perform the geometric analysis discussed with respect to FIG. 4 may be used for image to top-down mapping.

A 3D mesh for the image to top-down mapping is identified at 504. The 3D mesh may be constructed as discussed with respect to the method 400 shown in FIG. 4. The 3D mesh may provide a three-dimensional representation of the object and serve as an intervening representation between the actual perspective view image and the top-down view.

At 506, a pixel in the perspective frame is selected for analysis. According to various embodiments, pixels may be selected in any suitable order. For example, pixels may be selected sequentially. As another example, pixels may be selected based on characteristics such as location or color. Such a selection process may facilitate faster analysis by focusing the analysis on portions of the image most likely to be present in the 3D mesh.

The pixel is projected onto the 3D mesh at 508. In some implementations, projecting the pixel onto the 3D mesh may involve simulating a camera ray passing by the pixel position in the image plan and into the 3D mesh. Upon simulating such a camera ray, barycentric coordinates of the intersection point with respect to the vertices of the intersection face may be extracted.

A determination is made at 510 as to whether the pixel intersects with the object 3D mesh. If the pixel does not intersect with the object 3D mesh, then at 512 the pixel is set as belonging to the background. If instead the pixel does intersect with the object 3D mesh, then at 514 a mapped point is identified for the pixel. According to various embodiments, a mapped point may be identified by applying the barycentric coordinates as weights for the vertices of the corresponding intersection face in the top-down image.

In some embodiments, a machine learning approach may be used to perform image to top-down mapping on a single image. For example, a machine learning algorithm such as deep net may be run on the perspective image as a whole. The machine learning algorithm may identify 2D locations of each pixel (or a subset of them) in the top-down image.

In some implementations, a machine learning approach may be used to perform top-down to image mapping. For example, given a perspective image and a point of interest in the top-down image, the machine learning algorithm may be run on the perspective image for identifying the top-down locations of its points. Then, the point of interest in the top-down image may be mapped to the perspective image.

In some embodiments, mapping the point of interest in the top-down image to the perspective image may involve first selecting the points in the perspective image whose top-down mapping is closest to the interest point. Then, the selected points in the perspective image may be interpolated.

Figure 13:
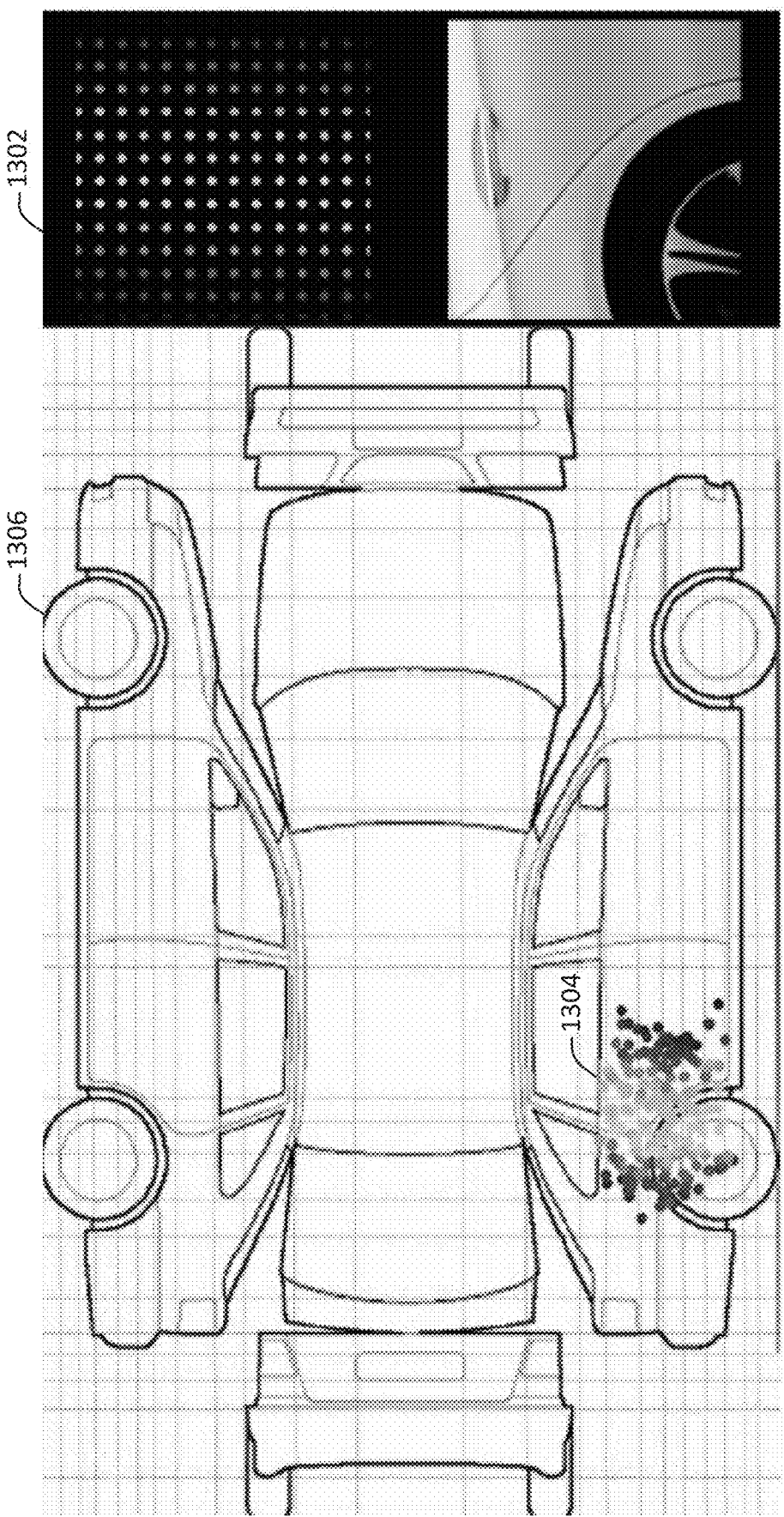
Figure 14:
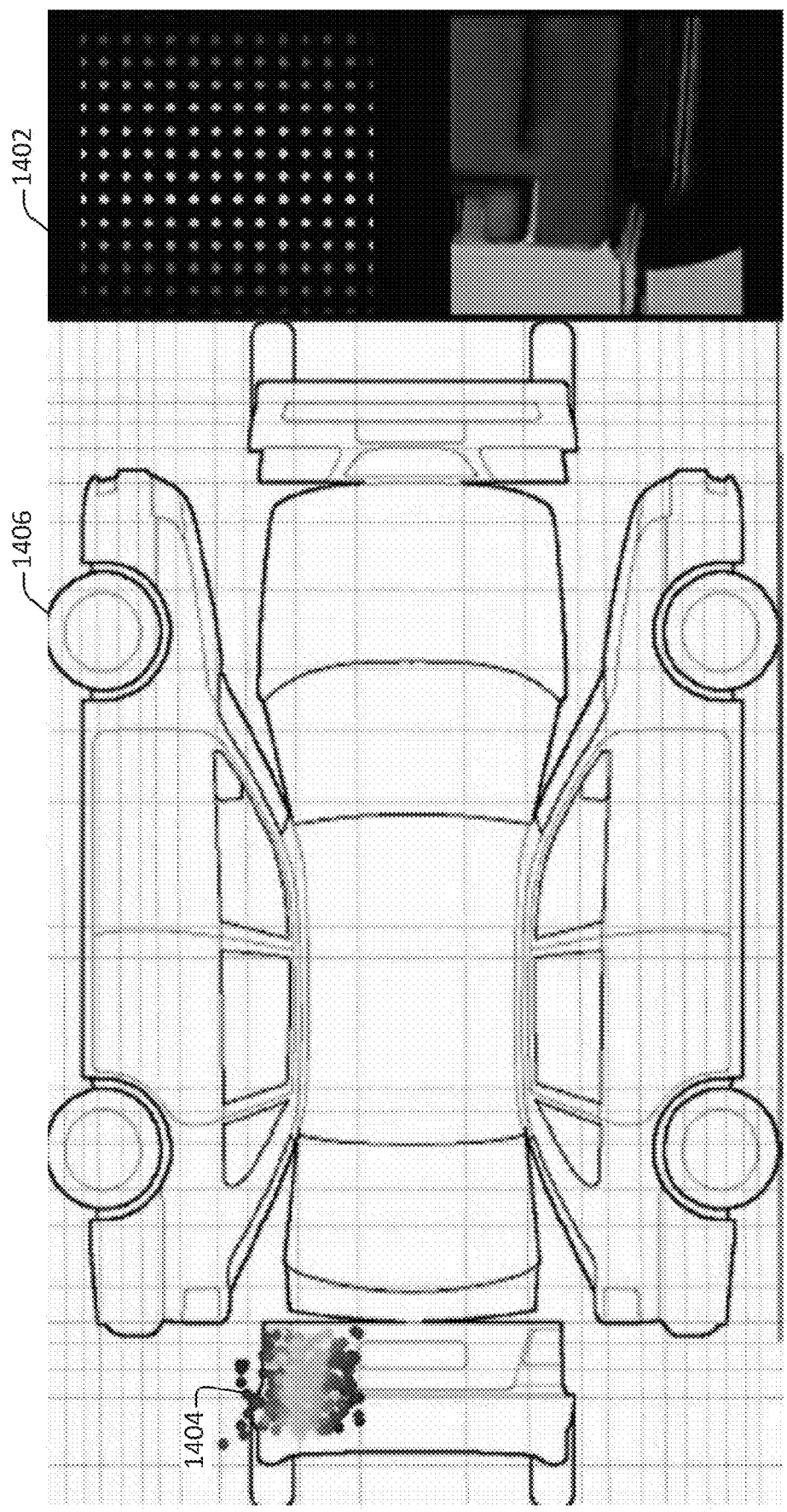
Figure 15:
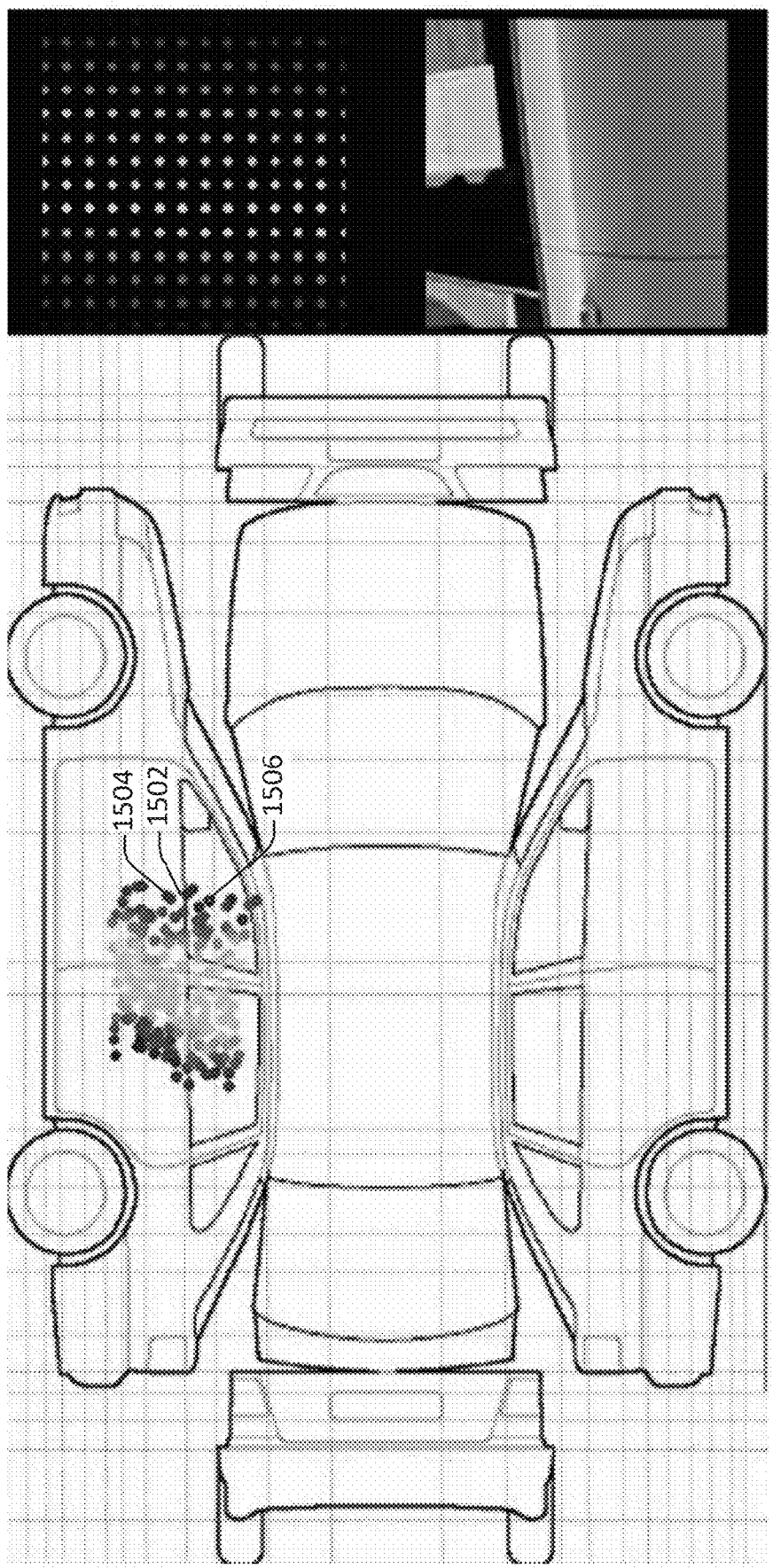

Examples of an image to top-down mapping are shown in FIGS. 13, 14, and 15. The locations of pixels in images of vehicle components are represented by colored dots. These dot locations are mapped from fixed locations 1302 in the perspective view to corresponding locations 1304 on the top-down view 1306. FIG. 14 shows a similar arrangement, with fixed locations 1402 in the perspective view mapped to corresponding locations 1404 in the top-down view 1406. For example, in FIG. 13, the color coding corresponds to the location of the points in the image. A similar procedure may be performed in reverse to map from the top-down view to the perspective view.

In some implementations, a point of interest may be mapped as a weighted average of nearby points. For example, in FIG. 15, the mapping of any particular point, such as 1502, may depend on the value of nearby points, such as 1504 and 1506, drawn from the mapped location in perspective view.

Returning to FIG. 5, as an alternative to operations 506-510, the projections of the 3D skeleton joints faces may be used together with the corresponding joints and faces in the top-down view to directly define image transformations that map pixel information from the perspective views into the top-down view and vice versa.

A determination is made at 516 as to whether to select an additional pixel for analysis. According to various embodiments, analysis may continue until all pixels or a suitable number of pixels are mapped. As discussed with respect to operation 506, pixels may be analyzed in sequence, in parallel, or in any suitable order.

Optionally, the computed pixel values are aggregated at 518. According to various embodiments, aggregating the computing pixel values may involve, for example, storing a cohesive pixel map on a storage device or memory module.

Figure 6:
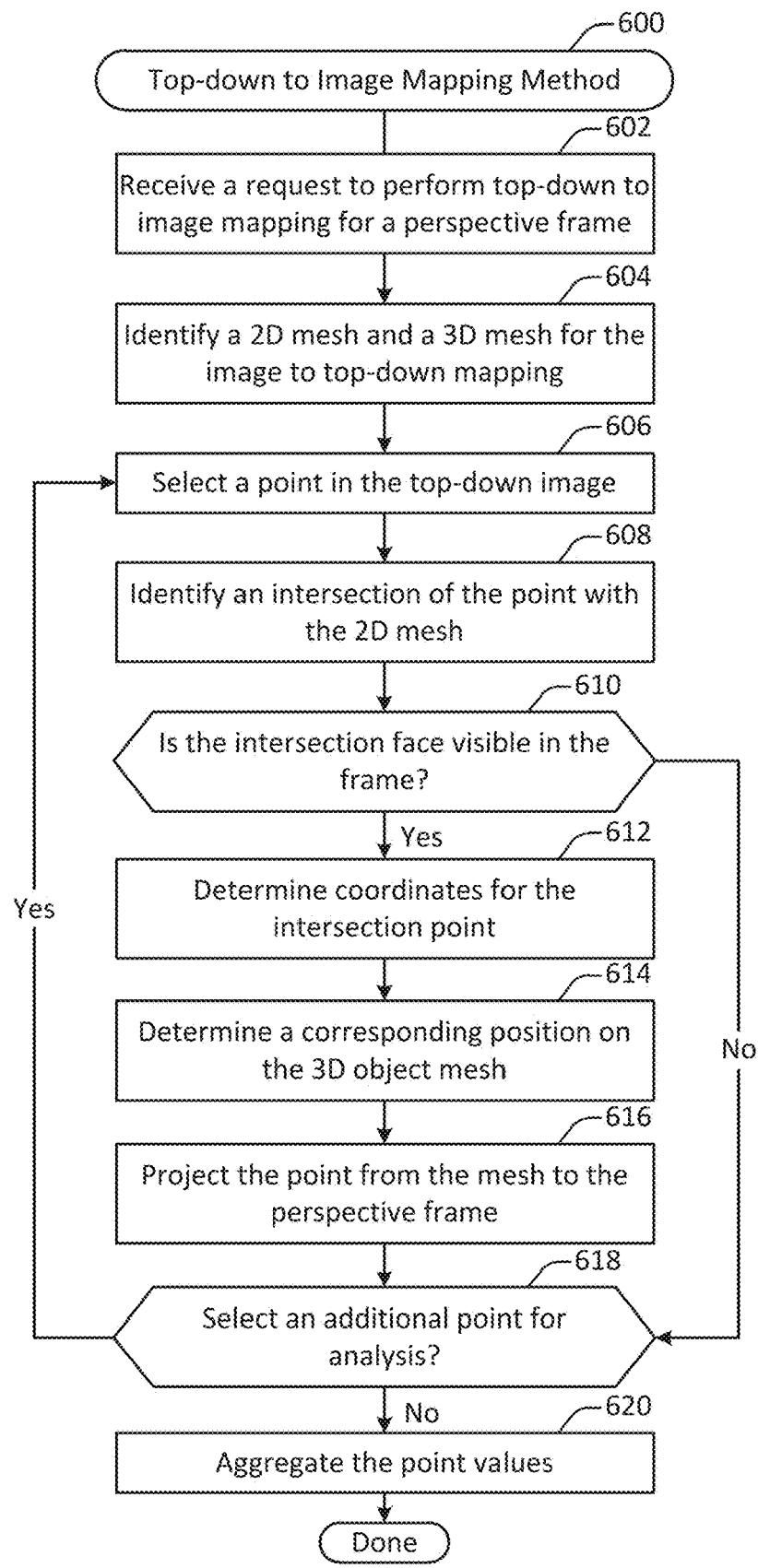
FIG. 6 illustrates one example of a method for performing top-down view to perspective image mapping, performed in accordance with one or more embodiments.

FIG. 6 illustrates one example of a method 600 for performing top-down view to perspective image mapping, performed in accordance with one or more embodiments. According to various embodiments, top-down to image mapping refers to finding in a perspective image the position points from a top-down image.

The method 600 may be performed on any suitable computing device. For example, the method 600 may be performed on a mobile computing device such as a smartphone. Alternately, or additionally, the method 600 may be performed on a remote server in communication with a mobile computing device.

At 602, a request to perform top-down to image mapping is received for a perspective frame. The request to perform top-down to image mapping may be generated after the completion of a geometric analysis method such as the method 200 shown in FIG. 2. For example, the request may be generated as discussed with respect to the operation 106 shown in FIG. 1.

At 604, a 2D mesh and 3D mesh are identified for the perspective image to top-down mapping. In some embodiments, a 2D mesh and 3D mesh may be constructed as discussed with respect to the method 200 shown in FIG. 2. A 3D mesh is also referred to herein as a 3D skeleton.

At 606, a point in the top-down image is selected for analysis. According to various embodiments, points may be selected in any suitable order. For example, points may be selected sequentially. As another example, points may be selected based on characteristics such as location. For example, points may be selected within a designated face before moving on to the next face of the top-down image.

At 608, an intersection of the point with the 2D mesh is identified. A determination is then made at 610 as to whether the intersection face is visible in the frame. According to various embodiments, the determination may be made in part by checking one or more visibility ranges determined in the preliminary step for the vertices of the intersection face. If the intersection face is not visible, then the point may be discarded.

If the intersection face is visible, then at 612 coordinates for the intersection point are determined. According to various embodiments, determining coordinate points may involve, for example, extracting barycentric coordinates for the point with respect to the vertices of the intersection face.

A corresponding position on the 3D object mesh is determined at 614. According to various embodiments, the position may be determined by applying the barycentric coordinates as weights for the vertices of the corresponding intersection face in the object 3D mesh.

The point is projected from the mesh to the perspective frame at 614. In some implementations, projecting the point may involve evaluating the camera pose and/or the object 3D mesh for the frame. For example, the camera pose may be used to determine an angle and/or position of the camera to facilitate the point projection.

Figure 10:
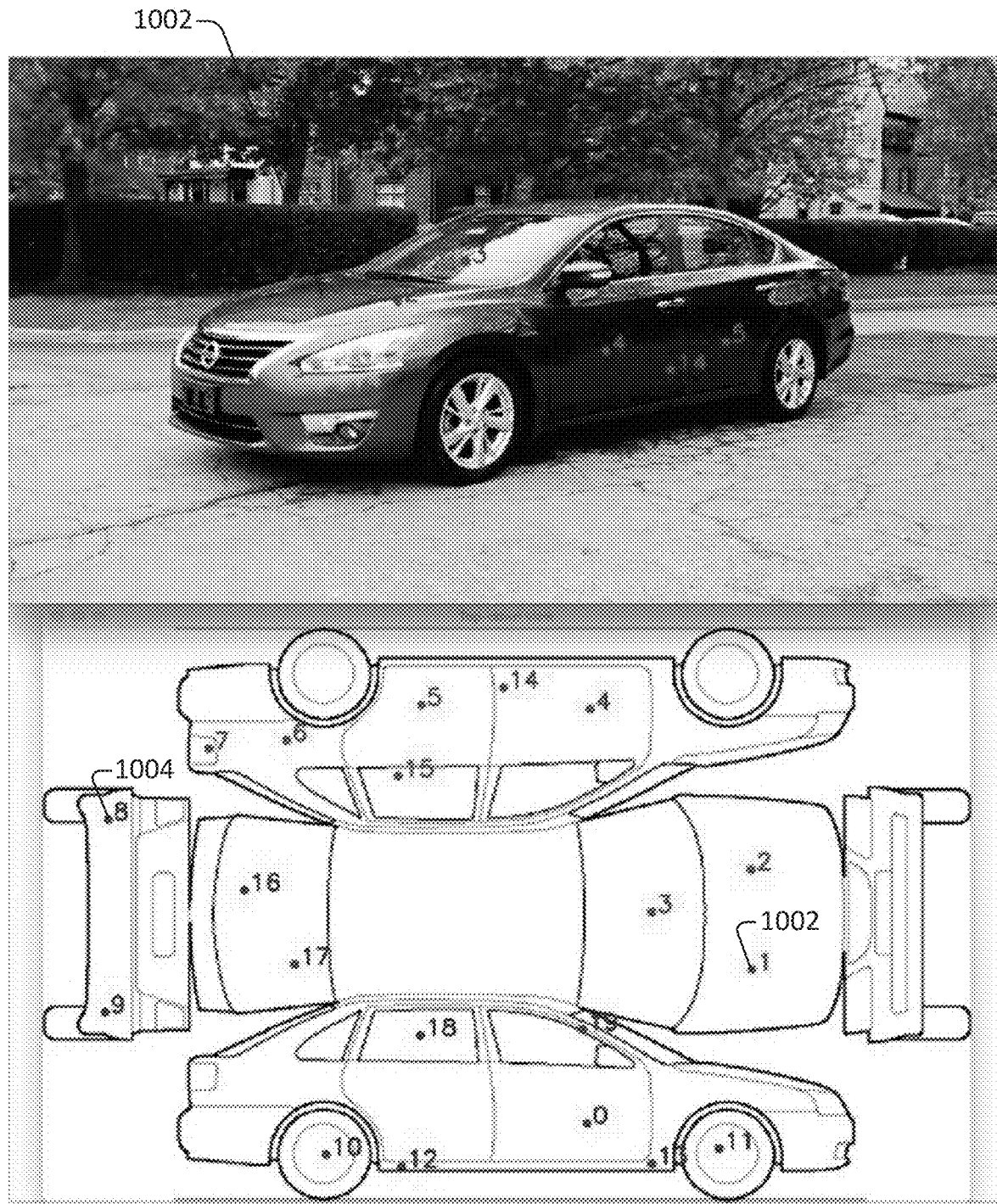

FIG. 10 illustrates an example of the mapping of 20 points from the top-down image of a vehicle to a perspective frame. In FIG. 10, points in red such as point 1 1002 are identified as visible in the perspective frame and are thus correctly mapped, while points in blue such as point 8 1004 are not mapped since they are not visible in the perspective view.

Figure 11:
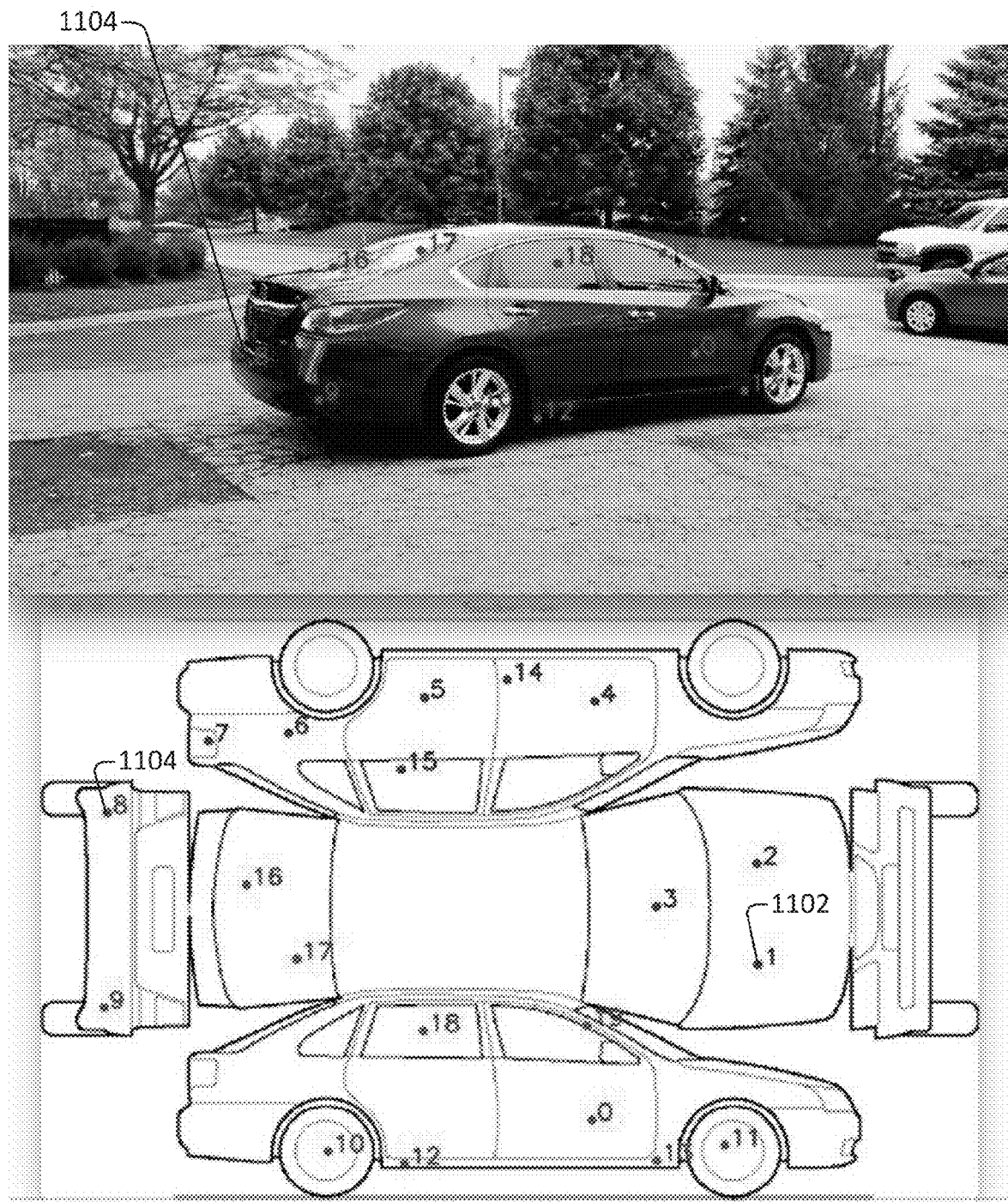

FIG. 11 illustrates an example of the mapping of the same 20 points from the same top-down image of the vehicle to a different perspective frame. In FIG. 11, joints that were not visible in FIG. 10 are now visible and thus are correctly mapped. For example, points in red such as point 8 1004 are identified as visible in the perspective frame and are thus correctly mapped, while points in blue such as point 1 1002 are not mapped since they are not visible in the perspective view.

According to various embodiments, if the top-down image contains information identifying which object part a pixel belongs to, then top-down mapping may forward such information to the object perspective frames. Alternately, or additionally, before running the machine learning algorithm to directly determine a mapping between image and top-down view, the system may first run a network to separate and/or segment all of the object parts.

Figure 12:
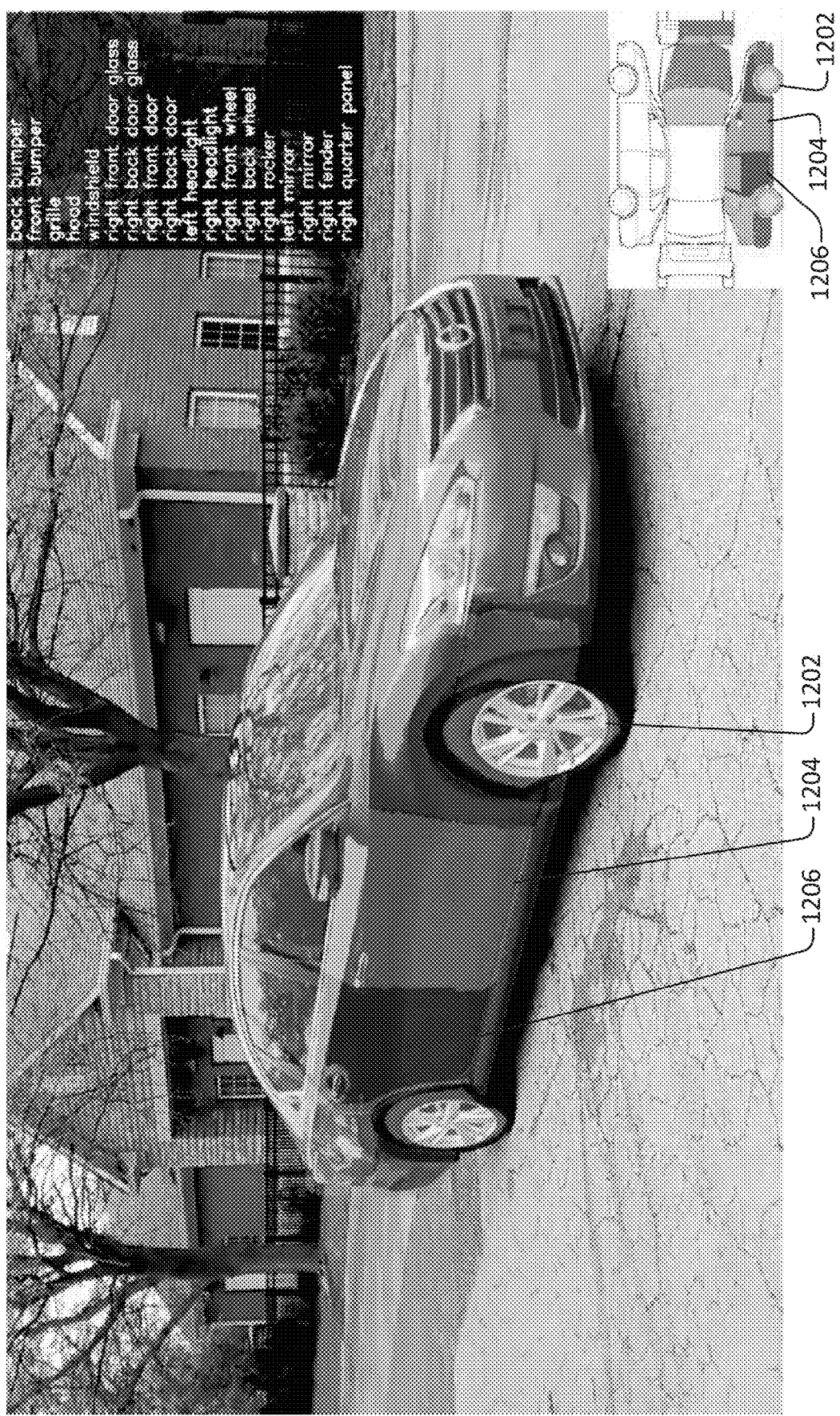

According to various embodiments, object component identity information may be used to allow separate mapping estimation for different object components. For example, the image of the vehicle shown in FIG. 12 has been segmented to identify the different vehicle components, which are shown in different colors. For example, the vehicle includes the components 1202, 1204, and 1206 which correspond with the front right wheel, the front right door, and the rear right door respectively. These components have then been separately supplied as input to the machine learning algorithm for the mapping estimation, as shown in the bottom right of the image.

In some implementations, different object sub-types may be associated with different top-down views. For example, sedans and trucks may be associated with different top-down views. In such configurations, the appropriate top-down view may then be determined based on the object sub-type. The object sub-type may be determined in any of various ways, such as user input, machine learning, or analysis of the 3D skeleton.

Returning to FIG. 6, as an alternative to operation 616, the projections of the 3D skeleton joints faces may be used together with the corresponding joints and faces in the top-down view to directly define image transformations that map pixel information from the perspective views into the top-down view and vice versa.

A determination is made at 618 as to whether to select an additional point for analysis. According to various embodiments, analysis may continue until all point within a top-down image or a suitable number of points are mapped.

Optionally, the computed point values are aggregated at 620. According to various embodiments, aggregating the computing point values may involve, for example, storing a cohesive point map on a storage device or memory module.

Figure 7:
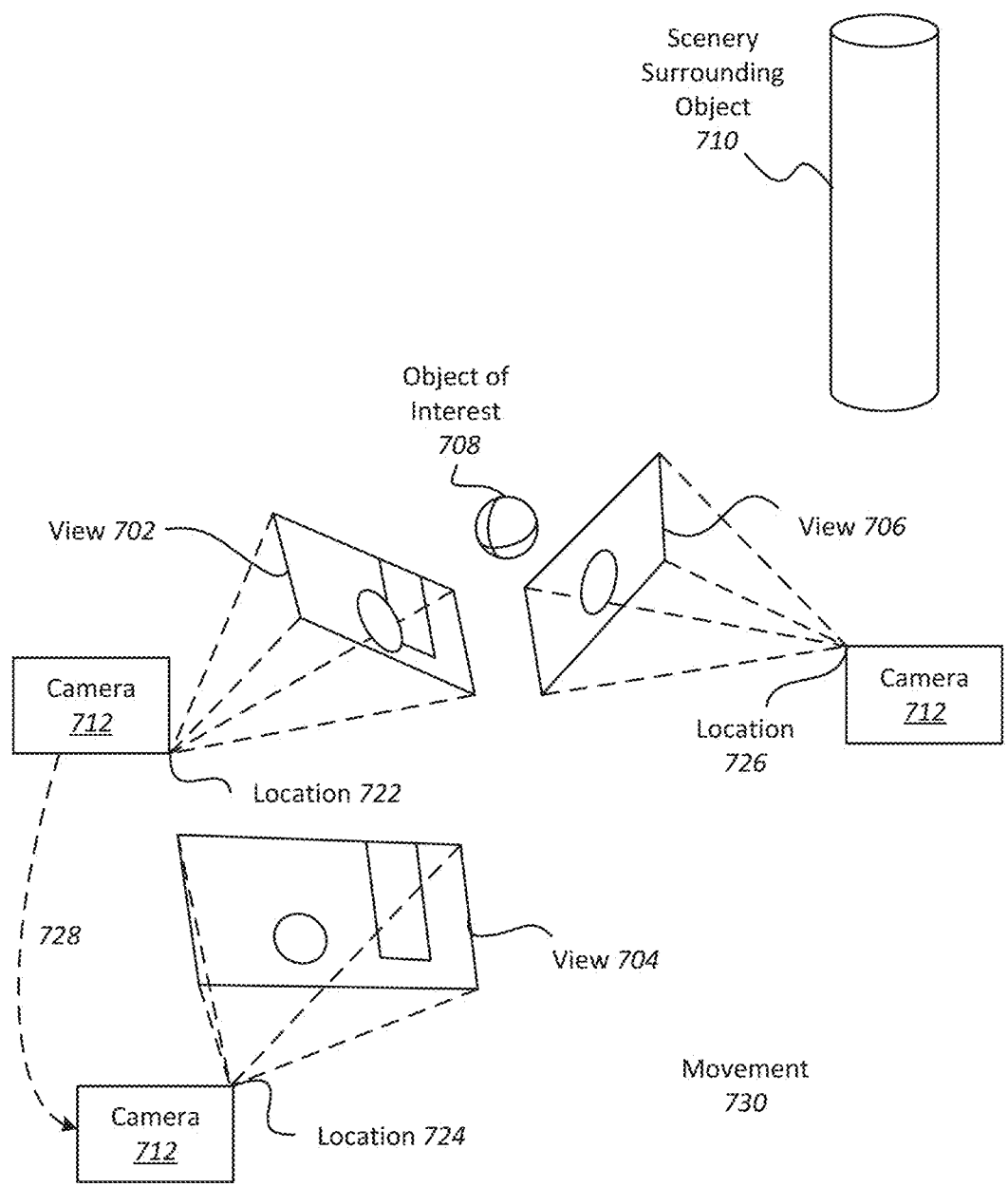
FIG. 7 illustrates an example of a device capturing multiple views of an object of interest.

With reference to FIG. 7, shown is an example of a device capturing multiple views of an object of interest from different locations. The capture device is indicated as camera 712, and moves from location 722 to location 724 and from location 724 to location 726. The multiple camera views 702, 704, and 706 captured by camera 712 can be fused together into a three-dimensional (3D) model. According to various embodiments, multiple images can be captured from various viewpoints and fused together to provide a mufti-view digital media representation.

In the present example embodiment, camera 712 moves to locations 722, 724, and 726, respectively, along paths 728 and 730, in proximity to an object of interest 708. Scenery can surround the object of interest 708 such as object 708. Views 702, 704, and 706 are captured by camera 712 from locations 722, 724, and 726 and include overlapping subject matter. Specifically, each view 702, 704, and 706 includes the object of interest 708 and varying degrees of visibility of the scenery surrounding the object 710. For instance, view 702 includes a view of the object of interest 708 in front of the cylinder that is part of the scenery surrounding the object 708. View 704 shows the object of interest 708 to one side of the cylinder, and view 706 shows the object of interest without any view of the cylinder.

In the present example embodiment, the various views 702, 704, and 706 along with their associated locations 722, 724, and 726, respectively, provide a rich source of information about object of interest 708 and the surrounding context that can be used to produce a multi-view digital media representation, such as a surround view. For instance, when analyzed together, the various views 702, 704, and 706 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 708 into content and the scenery 710 as the context. In particular examples, the content can then be used for applying filters.

Figure 8:
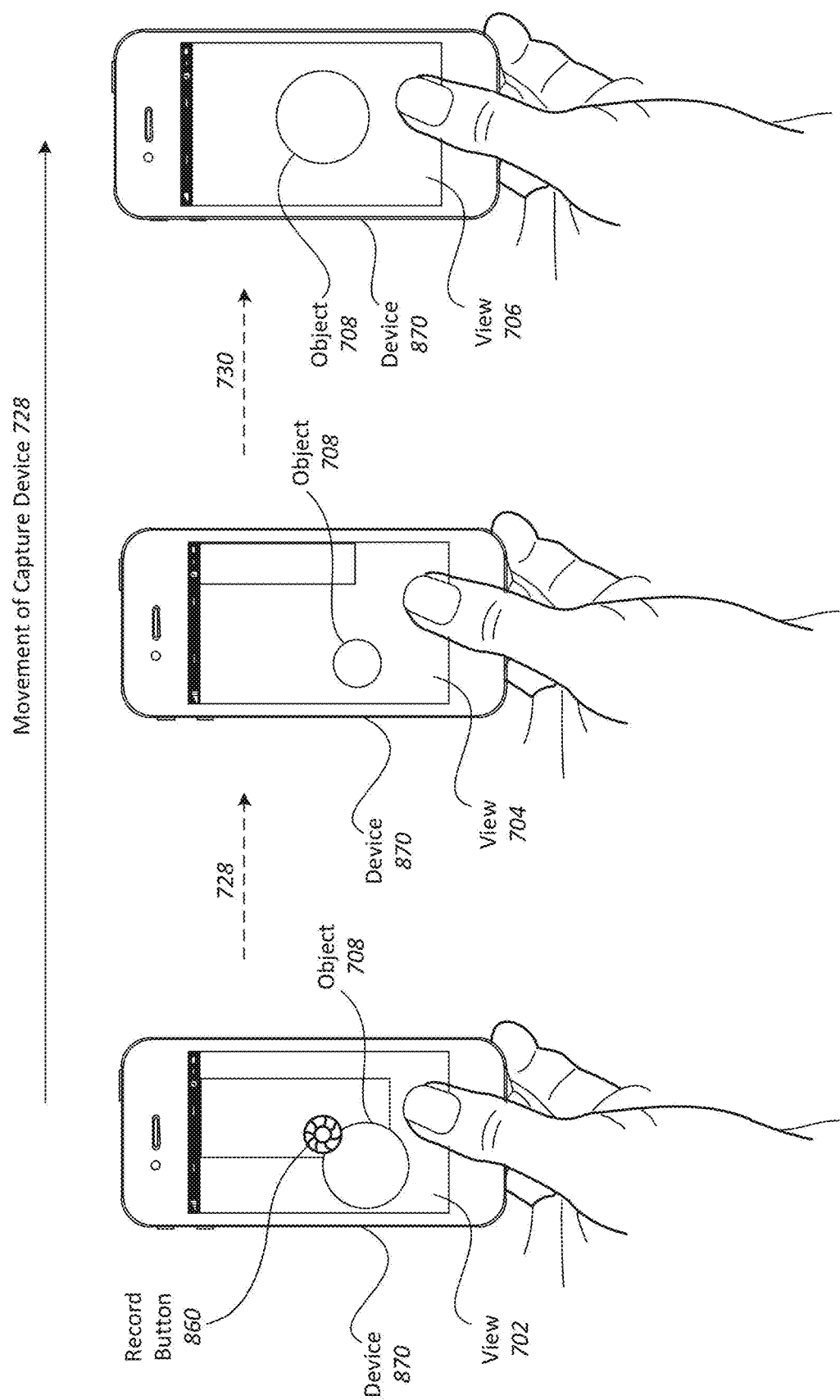
FIG. 8 illustrates an example of a device capturing views of an object of interest to create a multi-view media representation to which a filter may be applied.

With reference to FIG. 8, shown is an example of a device capturing views of an object of interest. During a filter session, multiple views of the object 808 may be captured by the device 870 from different locations. In the present example, data is acquired when a user taps a record button 880 on capture device 870 to begin recording images of the object.

The user moves 728 the capture device 870 from location 722 to location 724 along path 728 and from location 724 to location 726 along path 730. As described in more detail throughout this application, filtering can be provided at the device 870, and prompts for the user to capture particular views can be provided during the session. In particular, the system can prompt the user to move the device 870 in a particular direction or may prompt the user to provide additional information. For instance, the system may prompt the user to move the device 870 to capture one or more images to provide additional coverage of an object. As the user records different views of the object, coverage evaluation may be reiteratively refined to provide accurate results. The user may choose to stop recording by tapping the record button 880 again. In other examples, the user can tap and hold the record button during the session, and release to stop recording. In the present embodiment, the recording captures a series of images that can be used to generate a multi-view digital media representation that can be evaluated for coverage either in real-time or after-the-fact.

In some implementations, performing coverage evaluation for a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object.

Figure 16:
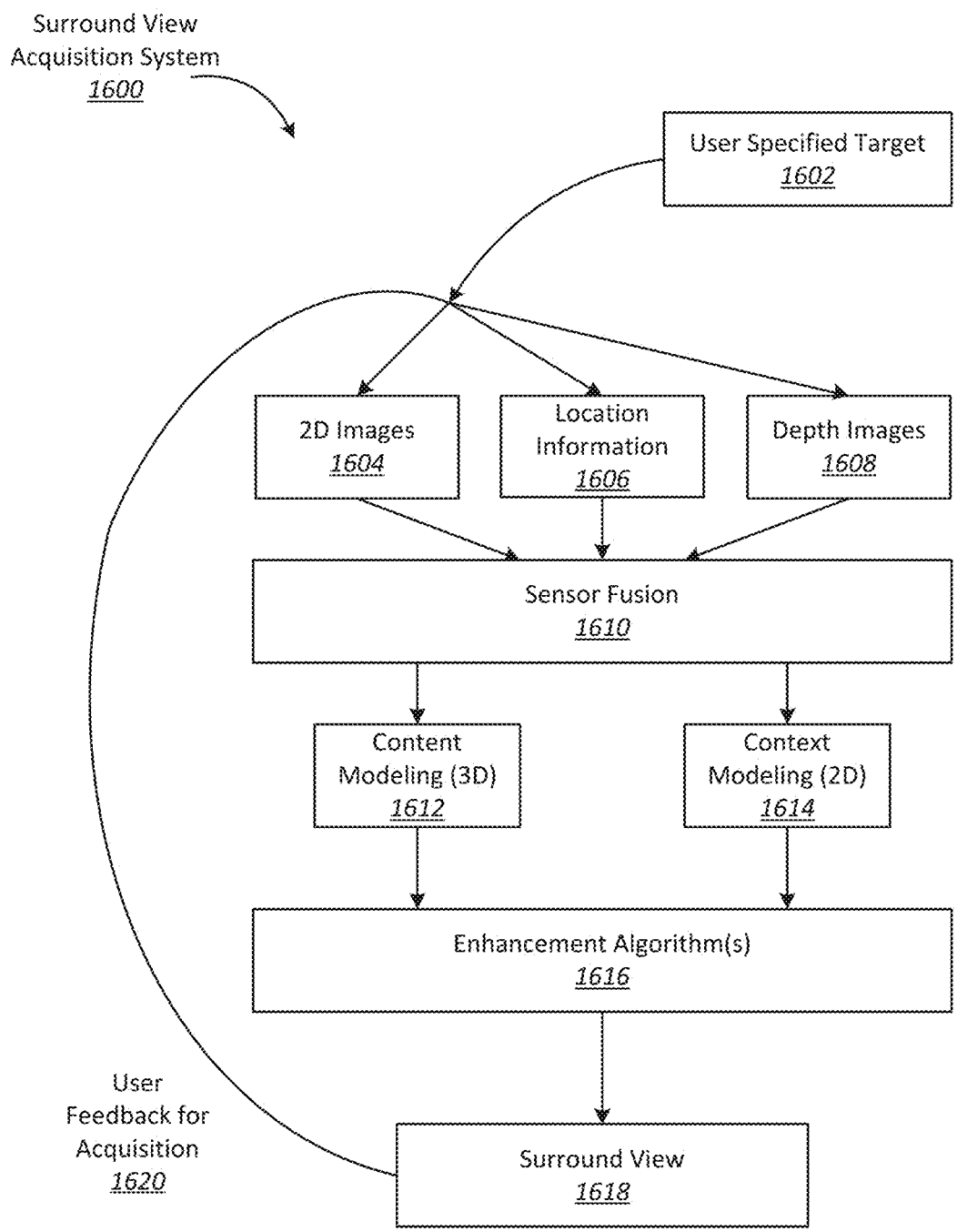
FIG. 16 illustrates an example of a surround view acquisition system configured in accordance with various embodiments.

With reference to FIG. 16, shown is an example of a surround view acquisition system that can be used to generate a multi-view interactive digital media representation that can be used for the application of filters or visual effects. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 1600 is depicted in a flow sequence that can be used to generate a surround view. According to various embodiments, the data used to generate a surround view can come from a variety of sources. In particular, data such as, but not limited to two-dimensional (2D) images 1604 can be used to generate a surround view. These 2D images can include color image data streams such as multiple image sequences, video data, etc., or multiple images in any of various formats for images, depending on the application. Another source of data that can be used to generate a surround view includes location information 1606. This location information 1606 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images

1608. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 1610. In some embodiments, a surround view can be generated a combination of data that includes both 2D images 1604 and location information 1606, without any depth images 1608 provided. In other embodiments, depth images 1608 and location information 1606 can be used together at sensor fusion block 1610. Various combinations of image data can be used with location information at 1606, depending on the application and available data.

In the present example embodiment, the data that has been fused together at sensor fusion block 1610 is then used for content modeling 1612 and context modeling 1614. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 1612 and context modeling 1614 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 1602 can be chosen. It should be noted, however, that a surround view can be generated without a user specified target in some applications.

In the present example embodiment, one or more enhancement algorithms can be applied at enhancement algorithm(s) block 1616. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixelto-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 1616. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 1618 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in applying filters or visual effects.

According to various example embodiments, once a surround view 1618 is generated, user feedback for acquisition 1620 of additional image data can be provided. In particular, if a surround view is determined to need additional views to provide a more accurate model of the content or context, a user may be prompted to provide additional views. Once these additional views are received by the surround view acquisition system 1600, these additional views can be processed by the system 1600 and incorporated into the surround view.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of vehicles. However, the techniques of the present invention apply to a wide variety of objects Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
    determining via a processor a mapping of a respective plurality of pixels in a visual representation of an object to a designated standard view of the object, the visual representation of the object including a designated perspective view image of the object;
    based on the mapping, identifying a designated portion of the object captured in the visual representation of the object, wherein the designated portion of the object is identified at least in part by identifying one or more portions of a grid overlaid on the standard view of the object, each of the identified grid portions including one or more of the mapped pixels, wherein each of the identified grid portions is associated with a respective coverage estimation value indicating a degree of coverage of the identified grid portion in the designated perspective view image of the object; and
    providing a user interface on a display device, the user interface indicating the designated portion of the object.

2. The method recited in claim 1, wherein the respective coverage estimation value includes a probability value estimating a probability that the identified grid portion is represented in the designated perspective view of the object.

3. The method recited in claim 2, wherein the respective coverage estimation value includes an uncertainty value identifying a degree of statistical uncertainty attached to the probability value.

4. The method recited in claim 1, wherein the respective coverage estimation value is determined based on a distance from a camera to the object, the distance associated with one or more of the pixels included in the identified grid portion.

5. The method recited in claim 1, wherein the respective coverage estimation value is determined based on an angle of a camera with respect to the object, the angle associated with one or more of the pixels included in the identified grid portion.

6. The method recited in claim 1, wherein the visual representation is a multi-view representation of the object that includes a plurality of perspective view images including the designated perspective view image, each of the plurality of perspective view images capturing a portion of the object from a respective viewpoint.

7. The method recited in claim 6, wherein the designated portion of the object is captured in one or more of the perspective view images, the method further comprising:
    determining a respective coverage evaluation mapping for each of the plurality of perspective view images based on the pixel mapping.

8. The method recited in claim 7, wherein the designated portion of the object captured is determined by aggregating the coverage evaluation mappings.

9. The method recited in claim 8, wherein aggregating the coverage evaluation mappings includes determining a probability of coverage for each of a plurality of portions of a grid overlaid on the standard view of the object.

10. The method recited in claim 6, wherein the multi-view representation of the object is navigable in three dimensions.

11. The method recited in claim 6, the method further comprising:
    constructing the multi-view representation at a mobile computing device that includes the processor.

12. The method recited in claim 11, wherein the multi-view representation is constructed at least in part based on inertial measurement unit (IMU) data collected from an IMU in the mobile computing device.

13. The method recited in claim 1, wherein the designated portion of the object is indicated in the user interface via a heatmap.

14. The method recited in claim 1, wherein the object is a vehicle.

15. A mobile computing device comprising:
    a camera configured to capture a visual representation of an object including a designated perspective view image of the object;
    a processor configured to determine a mapping of a respective plurality of pixels in the visual representation to a designated standard view of the object and identify a designated portion of the object captured in the visual representation of the object based on the mapping, wherein the designated portion of the object is identified at least in part by identifying one or more portions of a grid overlaid on the standard view of the object, each of the identified grid portions including one or more of the mapped pixels, wherein each of the identified grid portions is associated with a respective coverage estimation value indicating a degree of coverage of the identified grid portion in the designated perspective view image of the object; and
    a display device configured to provide a user interface indicating the designated portion of the object.

16. The mobile computing device recited in claim 15, wherein the visual representation is a multi-view representation of the object that includes a plurality of perspective view images including the designated perspective view image, each of the plurality of perspective view images capturing a portion of the object from a respective viewpoint, and wherein the designated portion of the object is captured in one or more of the plurality of perspective view images.

17. One or more non-transitory computer readable media having instructions stored thereon for performing a method, the method comprising:
    determining via a processor a mapping of a respective plurality of pixels in a visual representation of an object to a designated standard view of the object, the visual representation of the object including a designated perspective view image of the object;
    based on the mapping, identifying a designated portion of the object captured in the visual representation of the object, wherein the designated portion of the object is identified at least in part by identifying one or more portions of a grid overlaid on the standard view of the object, each of the identified grid portions including one or more of the mapped pixels, wherein each of the identified grid portions is associated with a respective coverage estimation value indicating a degree of coverage of the identified grid portion in the designated perspective view image of the object; and
    providing a user interface on a display device, the user interface indicating the designated portion of the object.

18. The one or more non-transitory computer readable media recited in claim 17, wherein the visual representation is a multi-view representation of the object that includes a plurality of perspective view images including the designated perspective view image, each of the plurality of perspective view images capturing a portion of the object from a respective viewpoint.

19. The mobile computing device recited in claim 15, wherein the visual representation is a multi-view representation of the object that includes a plurality of perspective view images including the designated perspective view image, each of the plurality of perspective view images capturing a portion of the object from a respective viewpoint.

20. The mobile computing device recited in claim 19, wherein the designated portion of the object is captured in one or more of the perspective view images, the processor further configured to:
  determine a respective coverage evaluation mapping for each of the plurality of perspective view images based on the pixel mapping.

* * * * *